United States Patent
Pan et al.

(10) Patent No.: US 11,398,890 B2
(45) Date of Patent: Jul. 26, 2022

(54) UNIFIED NON-ORTHOGONAL MULTIPLE ACCESS

(71) Applicant: IDAC Holdings, Inc., Wilmington, DE (US)

(72) Inventors: Kyle Jung-Lin Pan, Saint James, NY (US); Fengjun Xi, San Diego, CA (US); Erdem Bala, East Meadow, NY (US); Chunxuan Ye, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 19 days.

(21) Appl. No.: 16/961,223

(22) PCT Filed: Jan. 8, 2019

(86) PCT No.: PCT/US2019/012597
§ 371 (c)(1),
(2) Date: Jul. 9, 2020

(87) PCT Pub. No.: WO2019/139861
PCT Pub. Date: Jul. 18, 2019

(65) Prior Publication Data
US 2021/0067300 A1    Mar. 4, 2021

Related U.S. Application Data

(60) Provisional application No. 62/615,730, filed on Jan. 10, 2018.

(51) Int. Cl.
*H04L 5/00* (2006.01)
*H04B 17/309* (2015.01)
(Continued)

(52) U.S. Cl.
CPC .......... *H04L 5/0053* (2013.01); *H04B 17/309* (2015.01); *H04L 5/006* (2013.01); *H04L 27/2613* (2013.01); *H04W 24/10* (2013.01)

(58) Field of Classification Search
CPC ... H04L 5/0053; H04L 5/006; H04L 27/2613; H04B 17/309; H04W 24/10
See application file for complete search history.

(56) References Cited

U.S. PATENT DOCUMENTS

| 2008/0232503 A1 | 9/2008 | Kim et al. |
| 2015/0043540 A1 | 2/2015 | Nikopour et al. |

(Continued)

FOREIGN PATENT DOCUMENTS

| WO | 2017-196703 A1 | 11/2017 |
| WO | WO-2018064582 A1 * | 4/2018 |

OTHER PUBLICATIONS

Signature-based Non-orthogonal Multiple Access (S-NOMA) for Massive Machine-Type Communications in 5G; Mostafa Mohammadkarimi, Member, IEEE, Muhammad Ahmad Raza, Student Member, IEEE, Aug. 2018 (Year: 2018).*

(Continued)

*Primary Examiner* — Deepa Belur
(74) *Attorney, Agent, or Firm* — Condo Roccia Koptiw LLP

(57) ABSTRACT

Systems, methods, and instrumentalities are described herein that may be used for NOMA resource selection. Different types of NOMA resources may be configured by a network and selected by a WTRU based on rules, priorities, fairness, overloading factors, multiple access signature sizes, measurement results, payload sizes, and/or the like. Single-NOMA operations may be performed using DFT-invariant codewords. Multiple NOMA schemes may coexist with different codeword types and/or codeword sizes.

20 Claims, 17 Drawing Sheets

(51) Int. Cl.
    *H04L 27/26*    (2006.01)
    *H04W 24/10*    (2009.01)

(56) References Cited

U.S. PATENT DOCUMENTS

| | | | | |
|---|---|---|---|---|
| 2016/0374060 A1* | 12/2016 | Lim | .................... | H04L 5/0048 |
| 2017/0033901 A1* | 2/2017 | Tavildar | .................. | H04L 5/001 |
| 2018/0139774 A1* | 5/2018 | Ma | .......................... | H04L 1/189 |
| 2019/0174345 A1* | 6/2019 | Xing | .................... | H04W 24/10 |
| 2019/0229863 A1* | 7/2019 | Lei | ...................... | H04W 72/044 |
| 2019/0349905 A1* | 11/2019 | Matsuda | ............ | H04W 72/042 |
| 2020/0008221 A1* | 1/2020 | Keating | ............... | H04L 5/0037 |
| 2020/0068616 A1* | 2/2020 | Qian | .................... | H04L 5/0053 |

OTHER PUBLICATIONS

3GPP TSG RAN WG1 Meeting #86, R1-166552, "On UL Non-Orthogonal Multiple Access Schemes", Intel Corporation, Aug. 22-26, 2016, 5 pages.

ITU-R, "IMT Vision-Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

* cited by examiner

UNIFIED NON-ORTHOGONAL MULTIPLE ACCESS

CROSS-REFERENCE TO RELATED APPLICATIONS

This application is the National Stage Entry under 35 U.S.C. § 371 of Patent Cooperation Treaty Application No. PCT/US2019/012597, filed Jan. 8, 2019, which claims the benefit of Provisional U.S. Patent Application No. 62/615,730, filed Jan. 10, 2018, the disclosure of which is incorporated herein by reference in its entirety.

BACKGROUND

Use cases for fifth generation (5G) wireless communication systems may include Enhanced Mobile Broadband (eMBB), Massive Machine Type Communications (mMTC) and Ultra Reliable and Low latency Communications (URLLC). Different use cases may focus on different requirements such as higher data rate, higher spectrum efficiency, low power and higher energy efficiency, lower latency and higher reliability. A wide range of spectrum bands ranging from 700 MHz to 80 GHz may be considered for a variety of deployment scenarios.

SUMMARY

Systems, methods, and instrumentalities are described herein that may be used for non-orthogonal multiple access (NOMA) resource configuration and selection. A wireless transmit/receive unit (WTRU) may be configured to receive a configuration from a network. The configuration may indicate a first set of resources and a second set of resources to be used by the WTRU for uplink transmission. Each of the first and second sets of resources may be associated with at least one of an overloading factor value or a multiple access signature size. For example, the configuration may indicate that the first set of resources should be used with a high overloading factor (e.g. having a value above a first overloading threshold) and a short multiple access signature (e.g. having a length below a first signature length threshold). The configuration may further indicate that a second set of resources should be used with a low overloading factor (e.g. having a value below a second overloading threshold) and a long multiple access signature (e.g. having a length above a second signature length threshold).

The WTRU may perform a measurement. Based on the configuration and a result of the measurement, the WTRU may select one or more resources from the configured first and second sets of resources for an uplink NOMA transmission. For example, the WTRU may compare the result of the measurement with a measurement threshold, determine an overloading factor and a multiple access signature associated with the uplink NOMA transmission, and further determine, based on the comparison and the determined overloading factor and multiple access signature, that one of the first or second set of resources can be used for the NOMA transmission. The WTRU may select (e.g. randomly) one or more resources from the determined set of resources to send the uplink NOMA transmission.

The multiple access signature may be determined based on an indication received from the network and may be used to transmit the uplink NOMA transmission. The multiple access signature may comprise a codeword or a sequence. As such, the signature size may indicate a size of the codeword or sequence. The measurement threshold used for NOMA resource selection may also be configured by the network. The threshold may comprise a signal-to-noise ratio (SNR) threshold or a reference signal received power (RSRP) threshold, for example.

BRIEF DESCRIPTION OF THE DRAWINGS

A more detailed understanding may be had from the following description, given by way of example in conjunction with the accompanying drawings wherein.

DETAILED DESCRIPTION

Figure 1A:
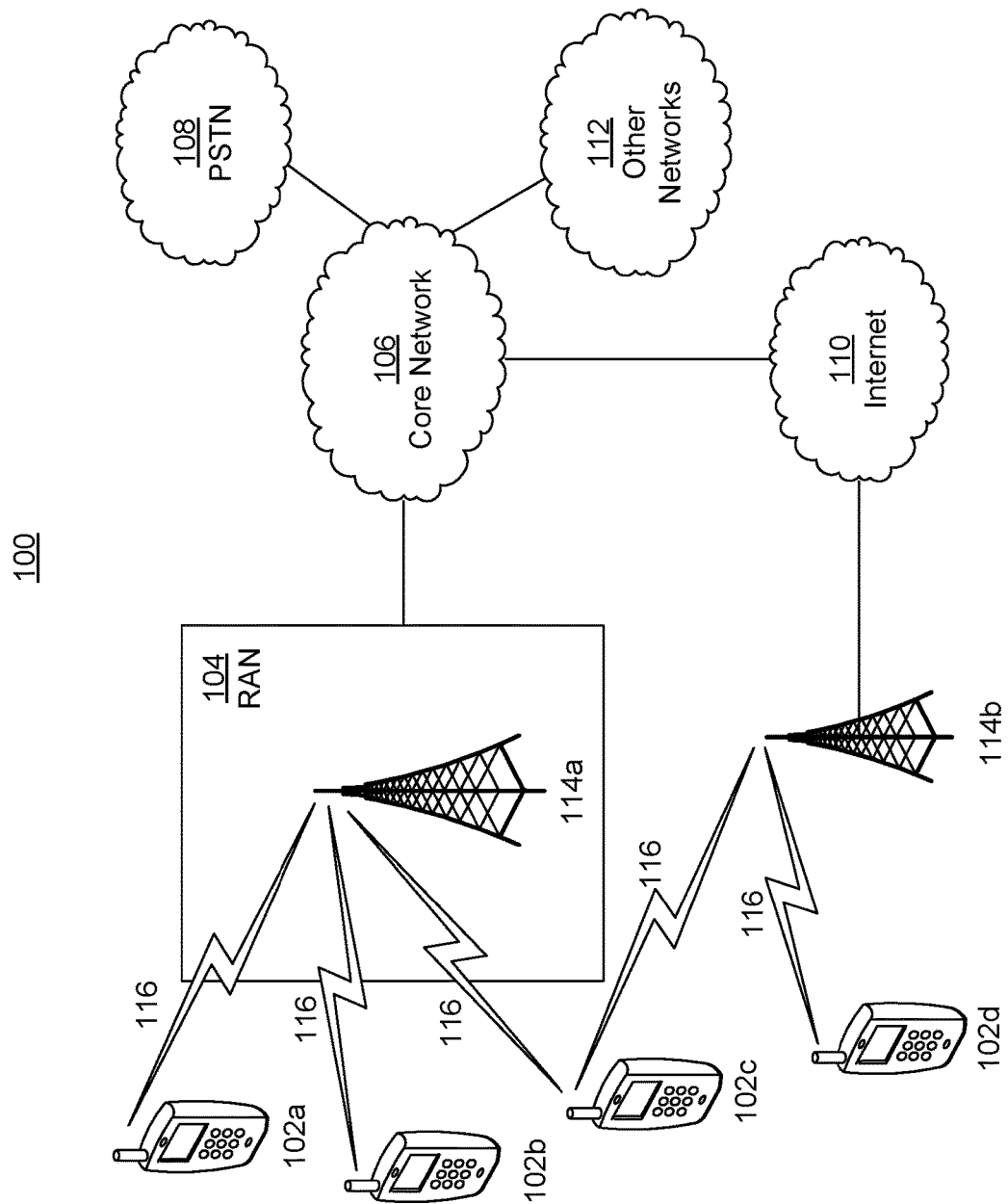
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
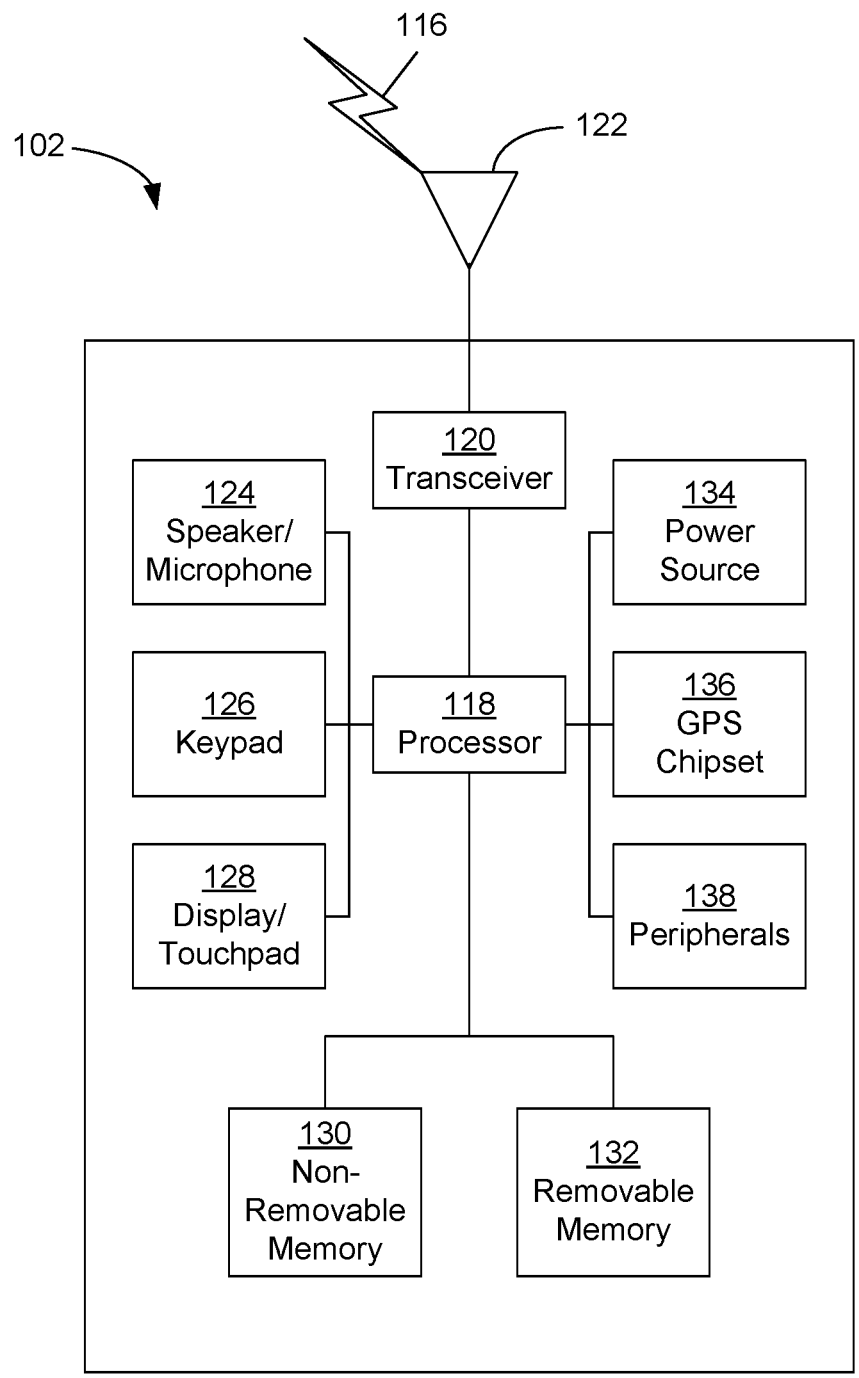
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
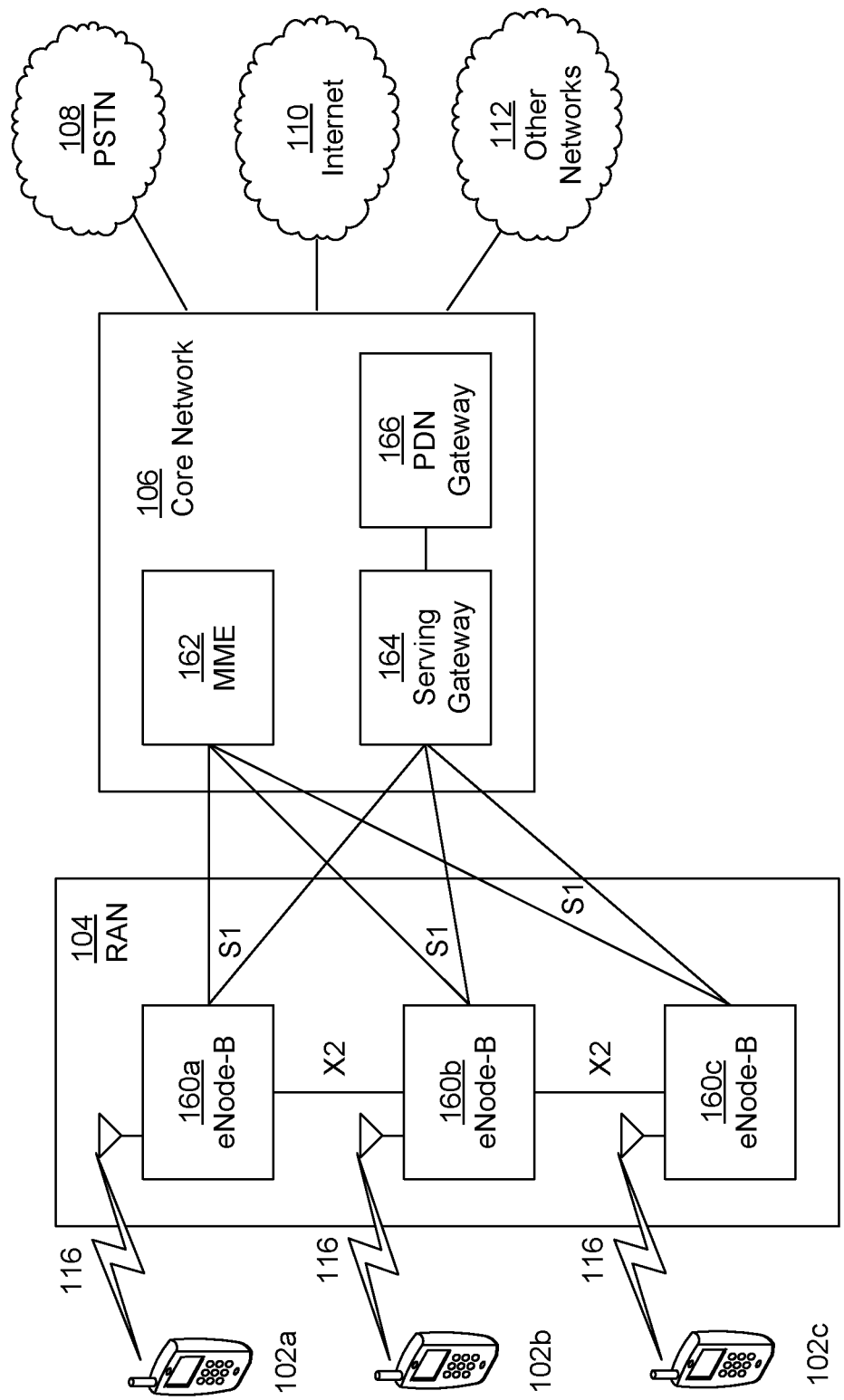
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
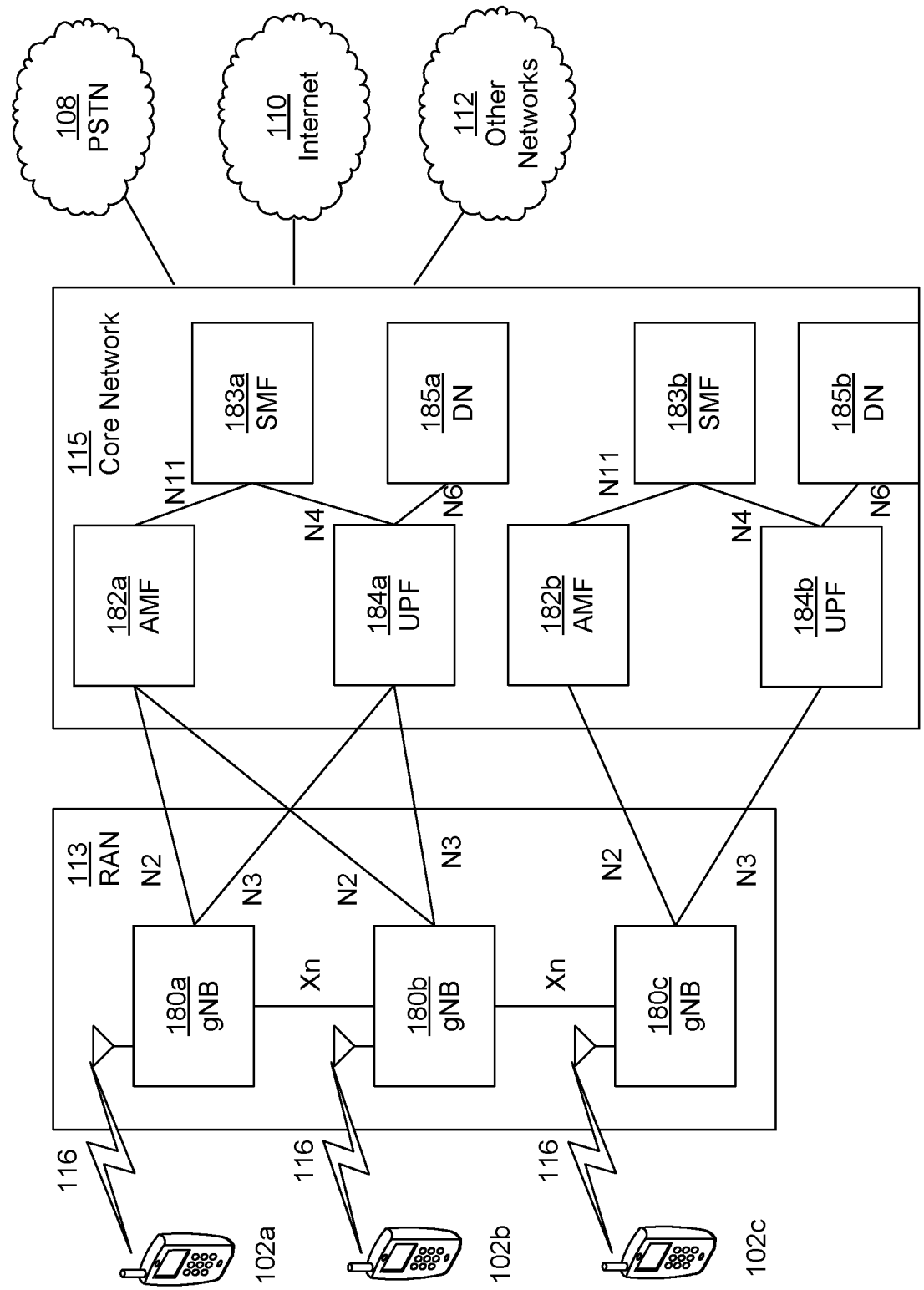
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (ills) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As carrier frequencies increase, path loss may affect coverage areas. Transmissions in a millimeter wave system may suffer from non-line-of-sight losses, e.g., diffraction loss, penetration loss, oxygen absorption loss, foliage loss, etc. Base stations and/or WTRUs may be designed/configured to overcome high path losses to discover each other, e.g., during an access process (e.g., an initial access process). Numerous (e.g., dozens or even hundreds of) antenna elements may be used to generate beam formed signals, e.g., to compensate path losses by providing beam forming gains. Beamforming techniques that may be utilized may include digital, analogue and/or hybrid beamforming.

Multiple access schemes for NR may be orthogonal, e.g., for downlink and/or uplink data transmissions. Using these schemes, time and frequency physical resources allocated to different users may not overlap. Non-orthogonal multiple-access (NOMA) schemes may be used for NR, e.g., for downlink multi-user superposition transmissions (MUST) and/or for uplink transmission. When referred to herein, a NOMA scheme may comprise a transmission scheme employing one or more non-orthogonal multiple access techniques related to, for example, scrambling, spreading, modulation, interleaving, waveforms, and/or the like.

NOMA schemes may increase link-level sum throughput (e.g., in the uplink (UL)), overloading capability, and/or system capacity, e.g., in terms of supported packet arrival rate when there is a resource shortage or outage in the system. NOMA schemes (e.g., UL NOMA) may be used for mMTC.

For non-orthogonal multiple access, there may be interference between transmissions using overlapping resources. As the system load increases, this non-orthogonal characteristic may become more pronounced. Transmitter side schemes such as spreading (e.g., linear or non-linear, with or without sparseness, etc.) and/or interleaving may be employed, e.g. to improve system performance and/or to ease the burden of advanced receivers.

Non-orthogonal multiple access schemes may be used in grant-based and/or grant-free transmissions. Non-orthogonal multiple access schemes may encompass a variety of use cases or deployment scenarios, including eMBB, URLLC, mMTC, etc. (e.g., to enable grant-free transmissions).

Higher data rates, lower latency, and/or massive connectivity may be supported in a NR system. For example, support may be provided for eMBB communications, URLLC and mMTC. With a broad range of applications and usage scenarios, radio access capabilities may differ across the range.

Multiple access schemes may assign time, frequency, and/or spatial resources such that one user's (e.g. one WTRU's) signal does not interfere with other users' signals. This type of access may be referred to as Orthogonal Multiple Access (OMA), with which transmissions by multiple users on orthogonal resources may be multiplexed in the time domain (TDM), in the frequency domain (FDM), and/or in the spatial domain (SDM).

Figure 2:
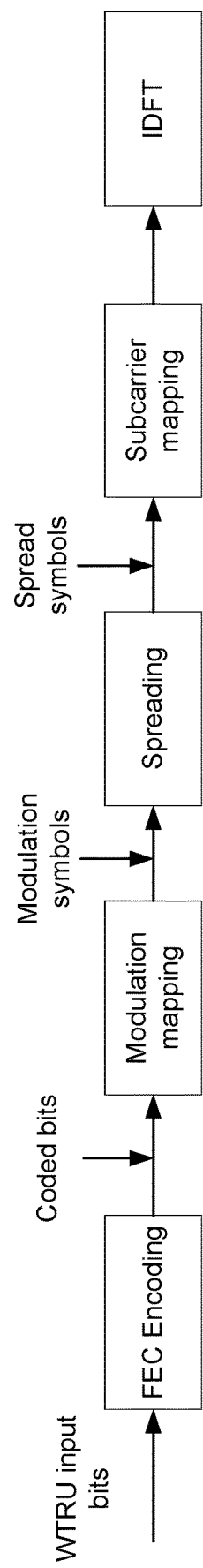
FIG. 2 is a diagram illustrating an example of a transmitter for a code-domain based NOMA scheme.

Non-orthogonal multiple access (NOMA) schemes may address challenges of wireless communications such as high spectral efficiency and massive connectivity. Using a NOMA scheme, multiple users may be multiplexed in the code-domain. Different WTRUs may be assigned different spreading sequences or codes, and may be multiplexed over the same time and/or frequency resources. FIG. 2 shows a diagram illustrating example operations that may be performed by a transmitter using a code-domain based NOMA scheme. A NOMA scheme (e.g. such as a NOMA scheme based on SCMA) may be configured to use short spreading sequences or codewords (e.g., having a length below a first threshold such as between four to eight or comprising four to eight samples). A NOMA scheme (e.g. such as a NOMA scheme based on RSMA) may be configured to use long spreading sequences or codewords (e.g. having a length above a second threshold such as a length of 64 or 128).

Different NOMA schemes may be suitable for different environments or requirements. For example, some NOMA schemes may be more robust in low signal quality regions while other NOMA schemes may work better in high signal quality regions. A NOMA scheme may be configured to address different environments, conditions and/or requirements (e.g., to increase the efficiency of NOMA operation).

NOMA operation may depend on receiver type and/or power differences. For example, some NOMA schemes may utilize successive interference cancellation (SIC) type receivers while other NOMA schemes may utilize non-SIC-based receivers. Some NOMA schemes may utilize power differences (e.g., depending on whether and/or how power domain NOMA is applied).

In certain NOMA schemes (e.g., those utilizing short spreading sequences or codewords), a (e.g., each) data modulation symbol such as a QPSK symbol may consume a portion of the available resources (e.g., a subset of subcarriers in an OFDM symbol). In examples (e.g., when a WTRU transmits two or more data modulation symbols), the number of sequences utilized may be the same as the number of data symbols utilized. This may result in fewer number of users being supported since, for example, the number of sequences (e.g. total number of available sequences) may be limited, the overloading factor (e.g. which may indicate the number of non-orthogonal sequences transmitted on the same resources) may be too high, etc. A number of techniques may be used to prevent or mitigate the reduction of the total number of users or WTRUs. For example, the number of data symbols that a WTRU may transmit may be increased. The overloading factor may be increased. The complexity of receivers may be reduced (e.g. a low-complexity receiver may be used).

A unified NOMA scheme may be provided. Example approaches for implementing unified NOMA are described herein.

A single NOMA scheme may be used, e.g., to cope with different requirements, environments, and/or signal quality regions. Multiple NOMA schemes may be allowed and integrated. A unified NOMA scheme may include a single NOMA scheme or multiple NOMA sub-schemes. The single NOMA scheme or each of the multiple NOMA sub-schemes may be based on (e.g. used to handle) one or more of: a particular environment, requirement, use scenario, or condition. The criteria for NOMA resource selection and/or NOMA scheme selection in accordance with environments, requirements, use scenarios, and/or operating conditions may be based on one or more of measurements (e.g. RSRP, RSRQ, SNR, etc.), power, energy, or the like.

Different NOMA schemes (e.g. including different sub-schemes within a unified NOMA scheme) may be configured for different environments, different requirements, different use scenarios, different operating conditions, and/or the like. For example, a first NOMA scheme (e.g. a sub-scheme within a unified NOMA scheme) may perform better in high SNR situations. Such a scheme may utilize a first type of multiple access (MA) signatures (e.g. short codewords or short sequences). A second NOMA scheme (e.g. a second sub-scheme within a unified NOMA scheme) may perform better in low SNR situations. Such a scheme may utilize a second type of MA signatures (e.g. long codewords or long sequences). A first NOMA scheme may be based on sparse code multiple access (SCMA) while a second NOMA scheme may be based on resource spread multiple access (RSMA), for example.

A WTRU may be configured or indicated (e.g. by a network entity such as a base station) with multiple NOMA schemes. A WTRU may decide which NOMA scheme to use based on one or more thresholds (e.g., measurement thresholds), such as a SNR threshold. The one or more thresholds may be configured or indicated to a WTRU by a network entity (e.g., a base station or gNB). The WTRU may compare its measurement results with the configured or indicated threshold(s) in order to decide which NOMA scheme to use. The measurements may include SS block (SSB) based measurements, channel state information reference signal (CSI-RS) based measurements, or a combination of SSB and CSI-RS based measurements (e.g., the NOMA threshold(s) may include a SSB based threshold, a CSI-RS based threshold or a combination of both). The measurements may be performed by the WTRU separately or jointly.

A NOMA threshold may be indicated (e.g. by a network entity such as a base station) and/or overridden. Such a NOMA threshold may be related to the performance of one or more NOMA operations (e.g., to determine a NOMA scheme, to select a NOMA resource, etc.). A NOMA threshold may be configured or indicated in remaining minimum system information (RMSI). A NOMA threshold may be configured or indicated via RRC signaling. A NOMA threshold indicated via RRC signaling may override a NOMA threshold indicated in RMSI, e.g., if a WTRU receives both RMSI and RRC signaling associated with a NOMA threshold.

A WTRU may perform one or more of the following. A WTRU may receive a NOMA threshold in RMSI (e.g. a NOMA threshold may be indicated in RMSI). A WTRU may use the NOMA threshold indicated or configured in RMSI to perform NOMA operations (e.g. to select a NOMA scheme). A WTRU may receive a NOMA threshold via RRC, media access control (MAC) control element (CE) and/or the like. A WTRU may use the NOMA threshold indicated or configured in RRC, MAC CE, and/or the like to perform NOMA operations (e.g. to select a NOMA scheme).

A WTRU may receive configuration information indicating that a NOMA threshold included in RMSI should be used. If a WTRU receives such configuration information, the WTRU may not use a NOMA threshold indicated or configured in RRC to override the NOMA threshold configured in RMSI.

A NOMA threshold may be derived from another set of one or more thresholds (e.g., implicitly or explicitly). For example, a difference or delta (e.g., which may be pre-configured and/or fixed) with respect to another threshold(s) may be applied in order to derive a threshold for NOMA. A NOMA threshold may be RSRP-based, RSSI-based, RSRQ-based, SNR-based, power-based, energy-based, and/or the like. One or multiple thresholds may be used to derive a NOMA threshold. A NOMA threshold may be derived from one or more SSB based thresholds, one or more CSI-RS based thresholds, and/or the like. A NOMA threshold may be derived from one or more thresholds associated with supplemental uplink transmission (SUL), such as one or more thresholds for carrier selection. SS block (SSB) based measurements, CSI-RS based measurements, or a combination of SSB and CSI-RS based measurements may be used separately or jointly, e.g., to determine whether a NOMA threshold has been met.

Figure 3:
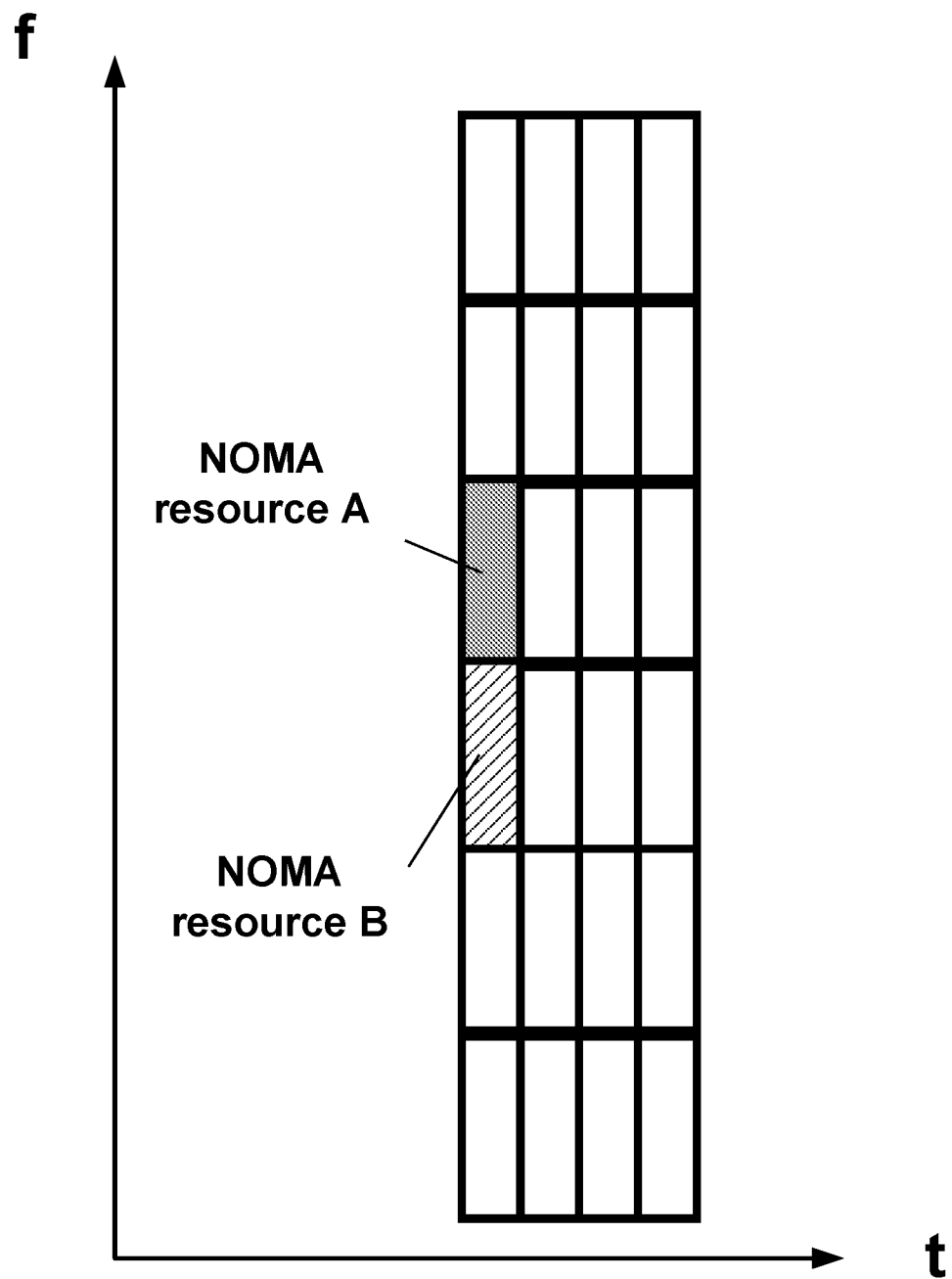
FIG. 3 is a diagram illustrating an example of using a NOMA threshold for selecting.
Figure 4:
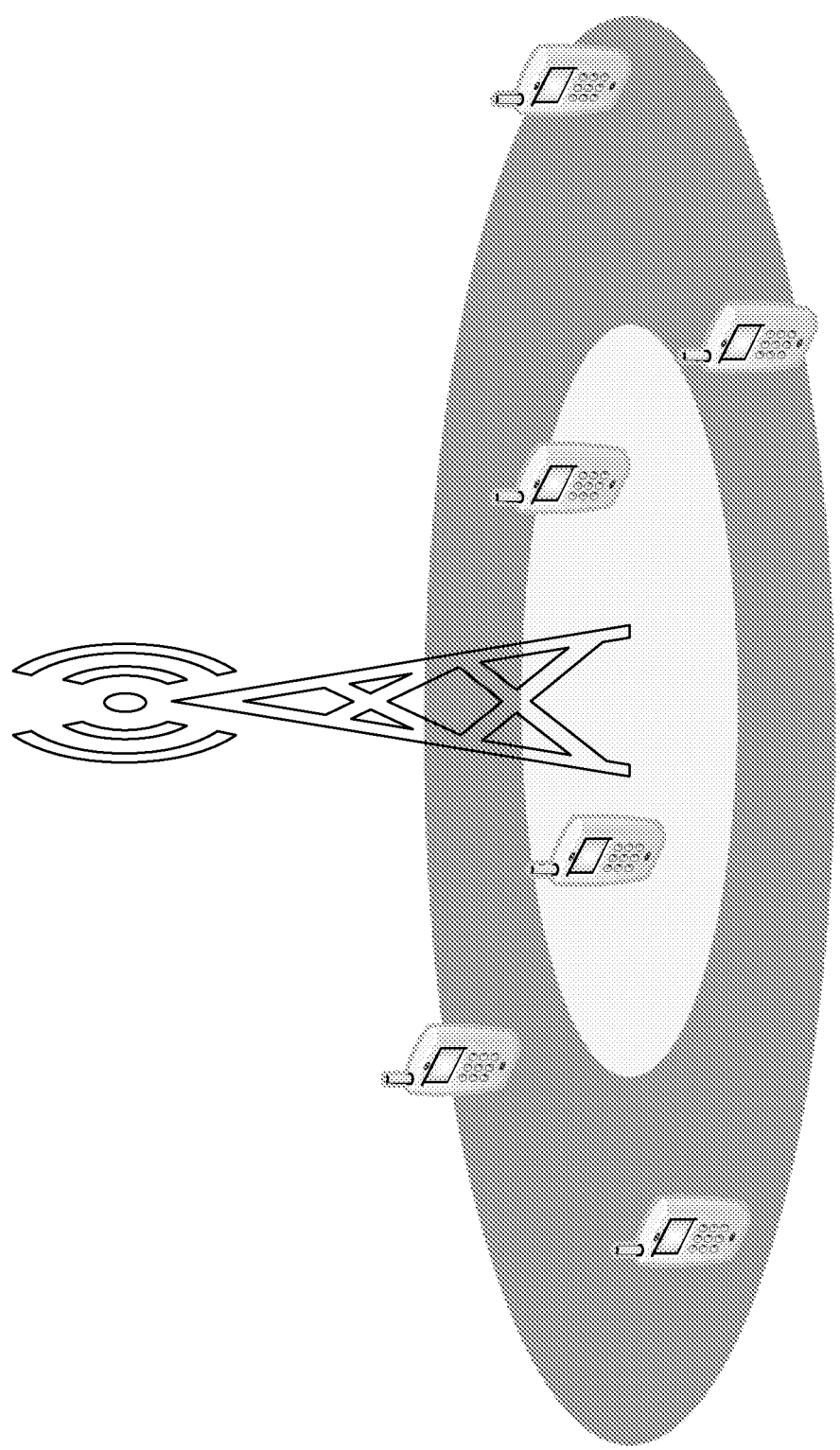
FIG. 4 is a diagram illustrating examples of single and multi-NOMA operating regions.

A NOMA threshold may be used to select a NOMA resource, a NOMA scheme (e.g. a unified NOMA scheme), and/or a NOMA sub-scheme (e.g. a NOMA sub-scheme within a unified NOMA scheme). FIG. 3 illustrates an example of using a NOMA threshold to select NOMA resources (e.g. time and/or frequency resources) such as NOMA resource A and/or NOMA resource B. For example, NOMA resource A may be selected if a first NOMA threshold is satisfied and NOMA resource B may be selected if a second NOMA threshold is satisfied. FIG. 4 shows examples of single and multi-NOMA operating regions. For example, the light grey area of FIG. 4 may represent a first NOMA operating region and the dark grey area may represent a second NOMA operating region. Different NOMA operating regions and/or different areas of a NOMA operating region may be associated with different operating conditions. A WTRU may carry out different NOMA operations depending on whether the WTRU is located in a first region or a second region, and/or depending on whether the WTRU is located inside a NOMA region and near the edge of a NOMA region.

Different types of NOMA resources and/or partitions may be provided. A network entity (e.g., a base station or gNB) may configure one or more of the following for a WTRU, e.g., to enable single or multiple NOMA schemes, to integrate the operation of multiple NOMA schemes in a system, etc. A network (e.g., a gNB) may configure one or more resource locations for a WTRU. A network (e.g., a gNB) may configure one or more resource types for a WTRU. A resource type may indicate a set of one or more resources (e.g. time, frequency and/or spatial resources) that a WTRU may use for a specific type of transmissions (e.g. URLLC transmission, eMBB transmissions, mMTC transmissions, transmissions using long or short sequences, etc.). A resource type may indicate a set of one or more resources (e.g. time, frequency and/or spatial resources) that a WTRU may use under a specific set of conditions (e.g. overloading conditions, RSRP and/or SNR conditions, etc.). A network (e.g., a gNB) may configure an association between NOMA resources and NOMA types for a WTRU. For example, such an association may indicate a mapping relationship between the type of resources and the type of NOMA transmission (e.g. the type of NOMA scheme used).

A WTRU may perform one or more of the following. The WTRU may receive an indication or configuration of resources or a resource pool (e.g., a dedicated time, frequency and/or spatial resource pool or time, frequency and/or spatial resources) for NOMA operation. The indication or configuration may be provided by a network entity such as a base station. The WTRU may perform autonomous selection for resources and/or resource types. For example, the WTRU may select a subset of the configured resources based on operating conditions, type of transmissions, etc., without receiving further instructions from the network.

The WTRU may be configured with or receive an indication of one or more of the following resource settings for NOMA. The WTRU may be configured with a single resource (e.g. one or more physical resource blocks (PRBs) that the WTRU may use for all types of transmissions). The WTRU may be configured with a set of resources of the same NOMA type (e.g. a set of resources or PRBs to be used with a specific NOMA scheme). The WTRU may be configured with multiple sets of resources corresponding to multiple NOMA types (e.g. multiple sets of resources or PRBs each associated with a specific NOMA scheme, operating condition, operating parameter, and/or performance requirement of the WTRU).

In examples (e.g., when a single resource is configured), one or more (e.g., all) WTRUs may perform NOMA operations, including selection of a NOMA signature (e.g. a sequence or codeword) and transmission of data, using a single resource. This approach may be used in a single NOMA scenario (e.g. when a WTRU is configured with one NOMA scheme), for example.

In examples (e.g., when a set of resources or a resource pool is configured), one or more (e.g., all) WTRUs may perform NOMA operations, including selection of a NOMA signature (e.g. a sequence or codeword) and transmission of data, using the set of configured resources (e.g., each WTRU may select one or more resources from this resource set or resource pool). The resources in the set of resources may be of the same type (e.g. configured for the same type of transmissions, same type of purposes, and/or same type of performance requirements). This approach may be used in a single NOMA or multi-NOMA scenario (e.g. a WTRU configured with multiple NOMA schemes).

In examples (e.g., when a set or pool of resources of multiple NOMA types are configured), one or more (e.g., all) WTRUs may perform NOMA operations, including selection of a NOMA signature and transmission of data, using resources from the configured set of resources (e.g., each WTRU may select a resource from the resource set). The resources in the set of resources may be of different types. This approach may be used in a multi-NOMA scenario (e.g. a WTRU configured with multiple NOMA schemes).

Resource selection may be made by a WTRU based on a rule or a set of rules. The rule or rules may be configured by a network (e.g. a base station). Different types of NOMA resources may be exclusive of (e.g., non-overlapping from) each other. Different types of NOMA resources may overlap with one another and the overlapped resources may be shared by WTRUs (e.g., whether the WTRUs use a same NOMA scheme or different NOMA schemes).

NOMA resources may be associated with (e.g., defined by) time, frequency, and/or space of any size. For example, NOMA resources may include a resource block, a resource block group, a resource element group, one or more spatial resources, one or more beam resources (e.g., analog or digital), one or more OFDM symbols, one or more time slots or mini-slots, one or more non-slots (e.g., sub-slots of a regular time slot), and/or the like.

A NOMA resource type (e.g. a set or pool of one or more resources) may be associated with the NOMA scheme(s) employed. Different types of NOMA resources (e.g. different sets or pools of resources) may be associated with or configured for different NOMA schemes. One or more of the following NOMA resources may be enabled, e.g., by indications/configurations from a network entity (e.g., a gNB). Different types of NOMA resources may be used by a single NOMA scheme. A same type of NOMA resources may be shared by different NOMA schemes.

A NOMA resource type may be defined by (e.g. configured based on) or associated with one or more of the following. A NOMA resource type may be associated with the use of power domain NOMA. A NOMA resource type may be associated with a receiver type, e.g., SIC-type receivers or non-SIC-type receivers, etc. A NOMA resource type may be associated with the size (e.g. length) of a multiple access signature (e.g. the size of the codeword or sequence used such as a long or short codeword or sequence). A codeword may be considered a long codeword if the size/length of the codeword exceeds a first signature length or codeword length threshold, and a codeword may be considered a short codeword if the size/length of the codeword is below a second signature or codeword length threshold. The first and second signature length thresholds may be the same or may be different. The respective values of the first and second signature length thresholds may pre-defined and/or configured (e.g. by a network). The respective values of the first and second signature length thresholds may vary based on operating conditions, use cases, performance requirements, and/or the like. A NOMA resource type may be associated with the type of codewords used (e.g. lattice codes, linear codes, etc.). A NOMA resource type may be associated with the transmission techniques employed (e.g. scrambling, spreading, interleaving, etc.). A NOMA resource type may be associated with an overloading factor (e.g. with the value of the overloading factor such as a high overloading factor value or a low overloading factor value). The value of an overloading factor may be considered high if the value exceeds a first overloading threshold, and the value of an overloading factor may be considered low if the value is below a second overloading threshold. The first and second overloading thresholds may be the same or may be different. The respective values of the first and second overloading thresholds may pre-defined and/or configured (e.g. by a network). The respective values of the first and second overloading thresholds may vary based on operating conditions, use cases, performance requirements, and/or the like. A NOMA resource type may be associated with signal quality. A NOMA resource type may be associated with use cases, scenarios, service or traffic types (e.g., eMBB, URLLC, or mMTC). A NOMA resource type (e.g. a set or pool of NOMA resources) may be configured based on an association of two or more of the foregoing factors or elements. For example, a network may configure a WTRU with a first NOMA resource type (e.g. a first set of resources) and a second NOMA resource type for respective combinations of overloading factor values (e.g. high or low overloading factors) and signature lengths (e.g. long or short sequence or codeword lengths). For instance, the first NOMA resource type may be configured to be used with a high overloading factor and a short codeword or sequence (e.g. having a length between 4 and 8), and the second NOMA resource type may be configured to be used with a low overloading factor and a long codeword or sequence (e.g. having a length of 64 or 128).

NOMA resource selection may be performed by a WTRU as follows. The WTRU may select NOMA resources and/or perform NOMA transmissions based on one or more rules. The one or more rules may be configured by a network (e.g. a base station). The rule(s) may be based on certain criteria (e.g., including certain measurement criteria such as the measurement thresholds described herein). A rule or a set of rules may be established (e.g. conveyed) for a WTRU as follows. The rule(s) may be predefined or fixed. The rule(s) may be configured by a network (e.g., a gNB). The rule(s) may be indicated (e.g. as a suggestion rather than a command) by a network (e.g., a gNB). The rule(s) may be derived based on other rule(s).

For example, a NOMA rule or a set of NOMA rules may be set as follows. If a measurement is greater than a threshold, a WTRU should select resource A. Otherwise (if the measurement is less than a threshold), the WTRU should select resource B. Resource A may be associated with NOMA scheme A targeting for high SNR, for example. Resource B may be associated with NOMA scheme B targeting for low SNR, for example. Such a rule may ensure that the WTRU operate in the right SNR region. The rule may be applied in a system with more than two NOMA schemes and/or more than two SNR regions.

The rule(s) and/or resource configuration described herein may be provided to a WTRU via signaling including semi-static signaling (e.g. use one or more of NR-Physical Broadcast Channel (NR-PBCH), RMSI, Periodic open systems interconnection (OSI), RACH message 2, RACH message 4, RRC signaling, On-demand OSI, etc.). The rules and/or resource configuration described herein may be provided to a WTRU via dynamic signaling such as via down control information (DCI), MAC CE, enhanced physical downlink control channel (ePDCCH), and/or the like.

The rules and/or resource configuration described herein may be provided to a WTRU via a combination of semi-static and dynamic signaling. In examples, semi-static signaling (e.g. RRC signaling) may be used to indicate a set of resources for NOMA and dynamic signaling (e.g. DCI) may be used to determine which one or more resources of the set of resources may be used for a specific NOMA transmission. In examples, a first dynamic signaling (e.g. a first DCI format or message) may be used to determine a subset of resources for NOMA, and a second dynamic signaling (e.g. a second DCI format or message) may be used to determine one of the resources from the subset of resources for NOMA.

In examples, RRC signaling, RMSI, and/or OSI signaling may be used to indicate a set of resources for NOMA. MAC CE or DCI may be used to determine which one or more (e.g. a subset) of the resources may be used for NOMA. In examples, RRC signaling, RMSI, or OSI signaling may be used to indicate a set of resources for NOMA, MAC CE may be used to determine a subset of resources for NOMA, and DCI may be used to determine one of the resource from the subset of resources for NOMA. NOMA solutions (e.g. the NOMA resource configuration/determination techniques described herein) may be applied to or used in combination with a grant-free transmission approach and/or with a grant-based transmission approach.

NOMA resource selection may be made based on rules with a fairness factor (e.g., to ensure the fairness of resource selection). A WTRU may be configured to select the same resource(s) if the WTRU is operating in the same environment, condition or SNR region. A WTRU may transmit using NOMA based on predefined, configured or indicated rules and/or procedures as illustrated below (e.g., to avoid or mitigate overloading situations).

The WTRU may perform one or more measurements, and may select a resource based on the measurement results. The WTRU may generate a random counter and use the random counter to determine whether to select a resource corresponding to a rule (e.g., a threshold rule). In examples, the WTRU may intend to select resource A (e.g., if measurement >Threshold T1) and may further check the random counter. If the counter value is greater than a threshold, T2, the WTRU may make a final decision and select resource A. As such, the probability of resource A being selected may be p2, the value of which may depend on the values of thresholds T1 and T2. If the counter value is not greater than the threshold T2, the WTRU may select resource B (e.g., with probability 1−p2).

In examples, the WTRU may intend to select resource B (e.g., if measurement <Threshold T1) and may further check the random counter. If the counter value is greater than a threshold, T3, the WTRU may make a final decision and select resource B. As such, the probability of resource B being selected may be p3, the value of which may depend on the values of thresholds T1 and T3. If the counter value is not greater than T3, the WTRU may select resource A (e.g., with probability 1−p3).

The thresholds T1 (e.g., which may be associated with measurements), T2 and T3 (e.g., which may be associated with the random counter) may be configured by a network entity (e.g., a gNB). By having different combinations of thresholds T1, T2 and T3, a system may achieve desirable SNR operations and/or resource fairness. T2 may be set to be the same as, greater than, or less than T3. T1, T2 and T3 may be configured by RMSI, OSI, paging, PBCH and/or RRC. Thresholds indicated via the RRC may override thresholds indicated in RMSI.

With specific values set for T1, T2 and T3, a WTRU may be distributed to different resources (e.g. different resource types) with different probabilities. For example, T2 may be set such that all WTRUs may be distributed to resource type A but not to resource type B (e.g., when short codewords and/or sparse code multiple access (SCMA) may not work well with resource type B). T3 may be set such that a first group of WTRUs may be distributed to resource type A while a second group of WTRUs may be distributed to resource type B (e.g., when long codewords and/or resource spread multiple access (RSMA) may work well in resource type B and in resource type A). When too many WTRUs are distributed to resource type B (e.g., upon applying a measurement-based selection rule), the WTRUs may be redistributed by adjusting the settings for T2 and/or T3.

The approach described above may be applied to single-NOMA or multi-NOMA operations. In the case of multi-NOMA operations, long codewords may be distributed to resources where the long codewords may or may not coexist with short codewords.

NOMA resource selection may be based on SNR differences. NOMA operations may depend on power differences and/or receiver types. For example, certain receivers may be SIC-type receivers while other receiver may be non-SIC-based receivers. Power differences may be utilized, e.g., depending on whether and/or how power domain NOMA is used.

Integrating receiver types and/or power conditions into NOMA operations and/or NOMA resource selection may enhance a NOMA system. For example, latency (e.g., decoding latency) and/or reliability (e.g., data detection reliability as indicated by block error ratio or BLER) may be considered for NOMA operations and/or NOMA resource selection. In examples (e.g., where NOMA is used with different power considerations in a system), a network (e.g., a gNB) may configure NOMA for a WTRU and the WTRU may receive a configuration and/or indication of resource locations, resource types, and/or an association between resources and resource types (e.g. a mapping between resources and resource types). The configuration and/or indication of resource locations, resource types, and/or association between resources and resource types may be associated with a configured NOMA scheme or multiple configured NOMA schemes. A WTRU may receive an indication regarding one or more dedicated resources for NOMA operations. For example, a WTRU may be configured with or may receive an indication for one or more resource settings for NOMA operations. The WTRU may receive a configuration or indication that a single resource should be used or that a set of resources of the same type or different types should be used. The resource types (e.g. for a NOMA scheme) may include, for example, a high signal quality resource type, a low signal quality resource type, and/or the like. High SNR WTRUs may be distributed to high signal quality resources (e.g., via proper resource selection). Low SNR WTRUs may be distributed to low signal quality resources (e.g., via proper resource selection).

Figure 5:
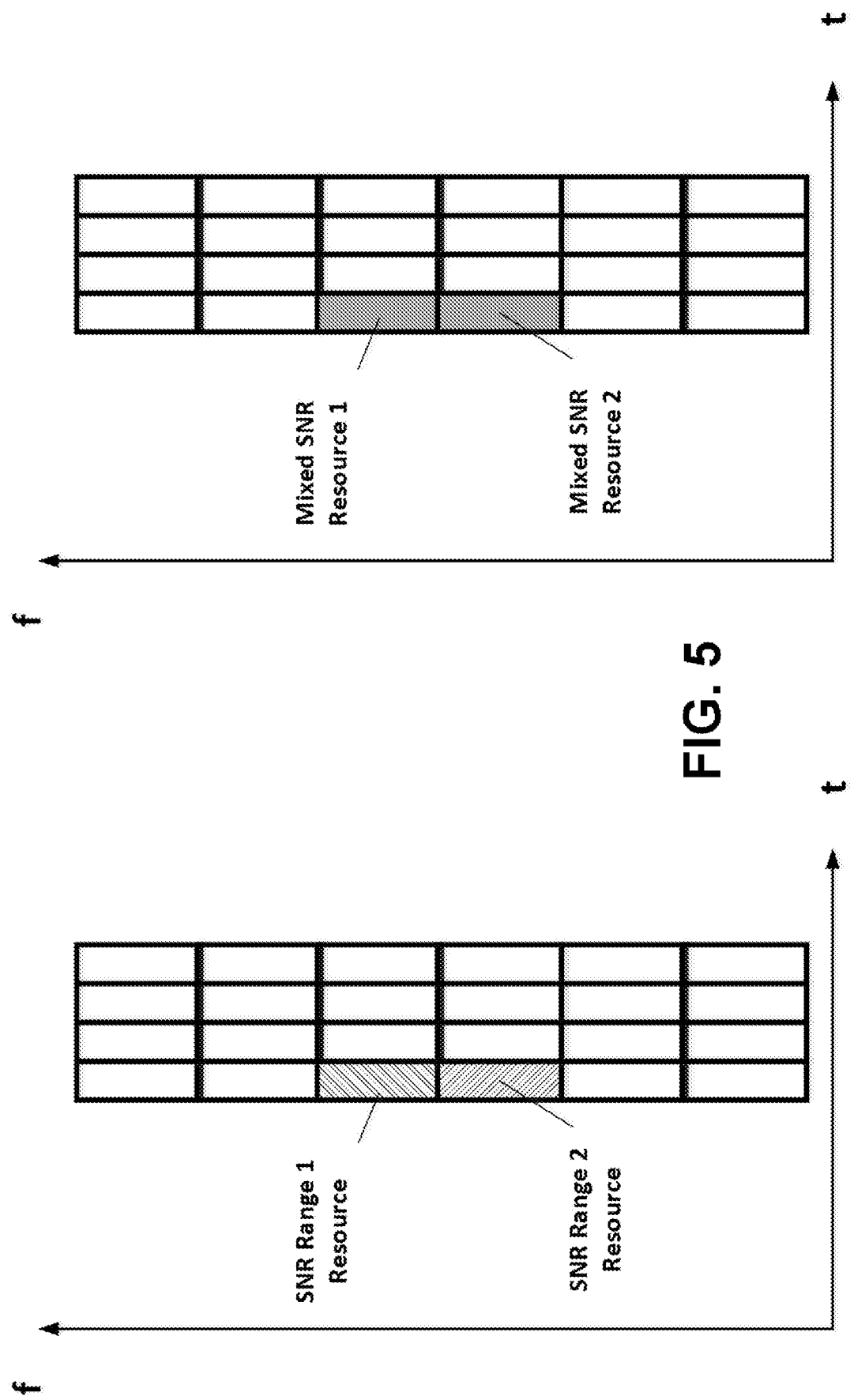
FIG. 5 is a diagram illustrating an example of measurement-based resource selection.

FIG. 5 illustrates an example of measurement-based resource selection. As shown, resource selection may be based on SNR measurements. Different resource(s) may be configured for different SNR ranges (e.g. SNR range 1 resource(s), SNR range 2 resources(s), etc.). Alternatively or additionally, one or more resources (e.g. resource 1 and resource 2, etc.) may be configured for mixed SNR (e.g. for high and low SNR). Measurement-based resource selection may allow a WTRU to maintain a same or similar SNR.

Figure 6:
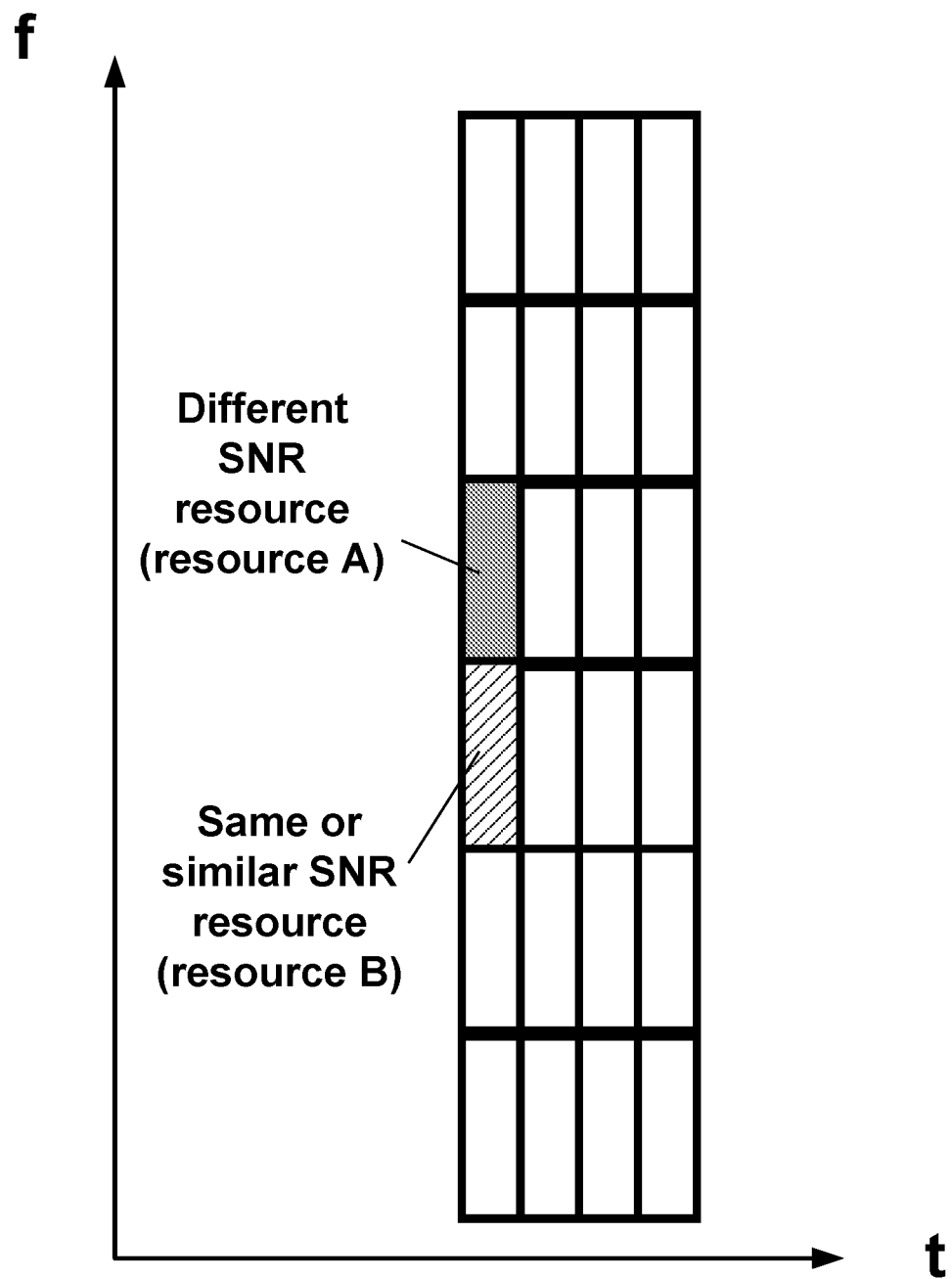
FIG. 6 is a diagram illustrating an example of NOMA resource selection based on a same or a different SNR.

SIC-type receivers may utilize the power differences between different WTRUs. A multi-threshold based solution may be provided (e.g., where NOMA is used with SIC-type receivers). FIG. 6 illustrates an example of NOMA resource selection by WTRUs based on whether the WTRUs experience the same SNR or a different SNRs. For example, two thresholds Q1 and Q2 may be defined (e.g., configured). Q1 may be a high threshold and Q2 may be a low threshold, e.g., Q1>Q2. A WTRU with measurement results above Q1 and a WTRU with measurement results below Q2 may experience different SNRs, and these WTRUs may select a first resource or set of resources (e.g. resource A shown in FIG. 6). WTRUs with measurement results between Q1 and Q2 may experience the same or similar SNR, and these WTRUs may select a second resource or set of resources (e.g. resource B shown in FIG. 6). For WTRUs using the first resource or set of resources (e.g. resource A in FIG. 6), transmissions may be decoded using SIC-type receivers or group SIC-type receivers. With group SIC-type receivers, a WTRU group may be detected and/or decoded using one or more SIC-type receivers and the WTRUs within the group may be detected and/or decoded using one or more non-SIC type receivers (e.g., via joint detection or parallel interference cancellation (PIC)). For WTRUs using the second resource or set of resources (e.g. resource B in FIG. 6), transmissions may be decoded using non-SIC type receivers (e.g., via joint detection or PIC).

In examples (e.g., where power domain NOMA utilizing the power differences between WTRUs is applied), pure measurement-based resource selection may be replaced by a selection mechanism that is based on measurements and/or random selection. For example, a WTRU may be configured with (e.g., may receive an indication of) a resource selection scheme and/or criteria (e.g., based on the WTRU's needs). If power domain NOMA is to be performed, the WTRU may be indicated to use random resource selection. This may facilitate the use of SIC-type receivers. Additionally or alternatively, the WTRU may be configured or indicated to make measurement-based selection (e.g., without relying on power control). With such a resource selection rule (e.g. using different resource selection schemes depending on whether power domain NOMA is applied), implicit power control may also be achieved. Alternatively or additionally, a WTRU may select a resource selection scheme autonomously (e.g., without being configured by a network).

A WTRU with URLLC traffic and/or high SNR measurements may be distributed (e.g. through network configuration and/or DCI) to resources associated with SNRs of a full range. The WTRU may be decoded, e.g., with a SIC-type receiver. A WTRU with non-URLLC traffic and/or low SNR measurements may also be distributed (e.g. through network configuration and/or DCI) to the resources associated with full-range SNRs and be decoded with a SIC-type receiver. The WTRU with URLLC traffic may have a higher SNR and/or higher power. As such, that WTRU may be decoded first during SIC-type receiver processing and/or with high reliability (e.g., since interferences by other WTRUs may be low). The WTRU with non-URLLC traffic may have a low SNR and/or lower power. As such, that WTRU may be decoded later during SIC-type receiver processing.

NOMA resource selection may be priority-dependent or priority-driven. A WTRU with non-URLLC traffic and/or low SNR measurements may be restrained (e.g. through network configuration and/or DCI) from using resources associated with full-range SNRs. A WTRU with non-URLLC traffic may not be decoded together with a WTRU with URLLC traffic and/or a SIC-type receiver. As more WTRUs with non-URLLC traffic and/or low SNR measurements are restrained from using resources associated with full-range SNRs, WTRUs with URLLC traffic may gain higher priorities, e.g., with less interferences arising from NOMA operations. In examples, WTRUs with non-URLLC traffic and/or low SNR measurements may be completely restrained from using resources associated with full-range SNRs. WTRUs with non-URLLC traffic and/or low SNR measurements may not be decoded at all with URLLC WTRUs. In these examples, a URLLC WTRU may gain the highest priority, e.g., since there may be minimal interference arising from NOMA operations.

A WTRU with non-URLLC traffic and/or medium SNR measurements may be distributed (e.g. through network configuration and/or DCI) to resources associated with SNRs of a specific range. The WTRU may be decoded with a non-SIC-type receiver. With priority-driven NOMA, low decoding latency and/or high detection reliability may be accomplished. Performance, latency and/or complexity may be adjusted based on assigned priorities.

A WTRU may select resources according to priority and/or power. In examples (e.g., when NOMA resource configuration and/or selection is based on priority), WTRUs, traffic, and/or services with a high priority may be given resources associated with SIC-type receivers and/or resources associated with different power levels (e.g. resources in which WTRUs have different power levels). Priority may be based on whether the traffic is URLLC or non-URLLC. A WTRU with high priority and/or high power may select resource(s) using a scheme as described above (e.g. selecting resources associated with full-range SNR).

A WTRU with high priority and low power may select resources that are associated with parallel interference cancellation (PIC) type receivers or joint detection type receivers, and/or resources that are associated with the same or similar power level (e.g. resources in which WTRUs have the same or similar power level).

If a WTRU having high priority and low power selects resources associated with SIC-type receivers or different power levels, the WTRU may be decoded later than other WTRUs (e.g., last in a processing queue) during SIC-type receiver processing (e.g., due to the low power setting of the WTRU). This may cause the WTRU to have larger decoding latency and/or lower reliability. Such a WTRU (e.g., with high priority and low power) may select resources associated with PIC-type or joint detection type receivers or resources associated with a same or similar power, e.g., to improve the performance of the WTRU.

The number of WTRUs distributed to certain resources may be controlled, e.g., where a URLLC WTRU may coexist with other URLLC WTRU(s) or with non-URLLC WTRU(s). For URLLC transmissions, orthogonal resources and/or non-orthogonal resources may be selected. A WTRU may select orthogonal resources for a URLLC transmission or select both orthogonal and non-orthogonal resources for a URLLC transmission (e.g., based on the priority of the URLLC transmission).

In examples (e.g., when non-orthogonal resources are used), a URLLC WTRU may share resources with a first number of (e.g. a normal number of) other WTRUs (e.g., when the URLLC WTRU has low priority URLLC transmissions or high reliability low latency communication (HRLLC) transmissions to send). The URLLC WTRU may share resources with a smaller number of other WTRUs (e.g., when the URLLC WTRU has medium priority URLLC transmissions to send). The URLLC WTRU may share resources with no other WTRUs (e.g., when the URLLC WTRU has very high priority URLLC transmissions to send). When the URLLC WTRU has very high priority URLLC transmissions to send, the WTRU may use orthogonal resources.

Figure 7:
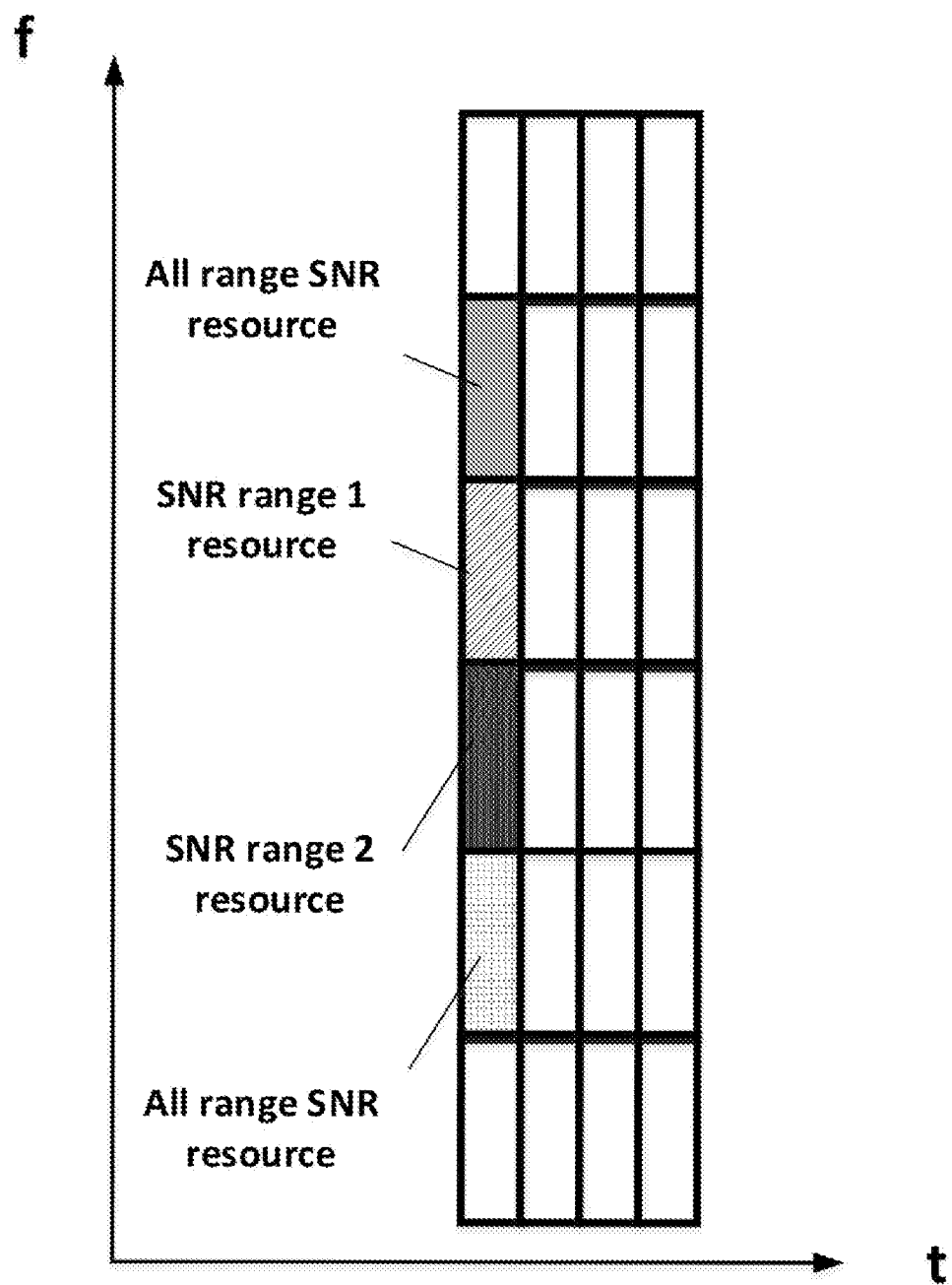
FIG. 7 is a diagram illustrating examples of priority-driven NOMA operations.

Resource types, resource selection, and/or the selection of a NOMA scheme may depend on the capability of a WTRU, may depend on the specific use case, may depend on the service or traffic type involved, etc. The number of NOMA schemes supported by a WTRU may depend on the capability of a WTRU. FIG. 7 illustrates an example of priority-driven NOMA operations. As shown, different resources may be configured based on SNR ranges. For example, a first resource or set of resources may be configured for all-range SNR (e.g. for high priority NOMA transmission), a second resource or set of resources may be configured for SNR range 1 (e.g. for medium priority NOMA transmission), and a third resource or set of resources may be configured for SNR range 2 (e.g. for low priority NOMA transmission).

NOMA resource configuration and/or selection may be based on an overloading factor (e.g. in combination with one or more other factors such as MA signature length). Resource type A may be associated with high overloading (e.g. a high overloading factor value or an overload factor having a value above a first overloading threshold) while resource type B may be associated with low overloading (e.g. a low overloading factor value or an overload factor having a value below a second overloading threshold). A WTRU may perform one or more of the following, e.g., so that different WTRUs may be distributed during resource selection to different NOMA resources that are configured based on overloading factors.

A WTRU may be configured with a plurality of sets of resources each associated with a respective overloading factor value. For example, the WTRU may be configured with a first set of resources associated with a low overloading factor value (e.g. an overload factor having a value below a first threshold) and a second set of resources associated with a high overloading factor value (e.g. an overload factor having a value above a second threshold). The WTRU may select one or more resources for NOMA transmission from the first or second set of configured resources based on a random factor. For example, the WTRU may generate a random counter. The WTRU may use the random counter to determine and select resources from the first or second set of configured resources. For example, if the counter value is greater than a threshold, T, the WTRU may select resource A (e.g., with probability p).

If the counter value is not greater than the threshold T, the WTRU may select resource B (e.g., with probability 1−p).

A network entity (e.g., a gNB) may configure the threshold T for the random counter. By setting the threshold T to different values, a system may achieve desired system performance given an overloading factor for NOMA resources. Threshold T may be configured by RMSI, OSI, paging, PBCH, and/or RRC. A threshold value configured by RRC (e.g., indicated in RRC signaling) may override a threshold value indicated in RMSI.

With a setting for the threshold T, a WTRU may be distributed to different resources or resource types with different probabilities. For example, T may be set such that more WTRUs may be distributed to resource type A (e.g., which may be associated with a high overloading factor) and fewer WTRUs may be distributed to resource type B (e.g., which may be associated with a low overloading factor). T may be set such that all WTRUs may be distributed to resource type A (e.g., which may be associated with a high overloading factor) and no WTRU may select resource type B (e.g., which may be associated with a low overloading factor). These techniques may be applied to single and multi-NOMA operations.

Overloading factor-based resource configuration and/or selection may be combined with threshold-based NOMA resource configuration and/or selection. The threshold-based NOMA resource selection may utilize various types of thresholds including, for example, a measurement threshold such as a SNR threshold or a RSRP threshold, a multiple access signature threshold such as a sequence or codeword length threshold, etc. For example, in a single NOMA system, high SNR resources may accommodate more WTRUs while low SNR resources may accommodate fewer WTRUs. When a higher number of WTRUs select high SNR resources and a low number of WTRUs select low SNR resources, the NOMA system performance may be improved. Measurement-based resource selection may be applied with one or more bias rules. For example, by increasing the power of low SNR WTRUs to force them to select high SNR resources, more WTRUs may be accommodated using high SNR resources and fewer WTRUs would use low SNR resources. A random power increase for low SNR WTRUs may be applied. A WTRU may generate a random number to decide if the WTRU should increase its power or not. For example, if the generated random number is above a threshold, the WTRU may increase its power. Otherwise, the WTRU may not increase its power. The generated random number may be used to determine the amount of power increase. For example, the generated random number may represent (e.g., be used as) the amount of power increase. Additionally or alternatively, the amount of power increase may be determined based on measurements or may be predefined.

Figure 8:
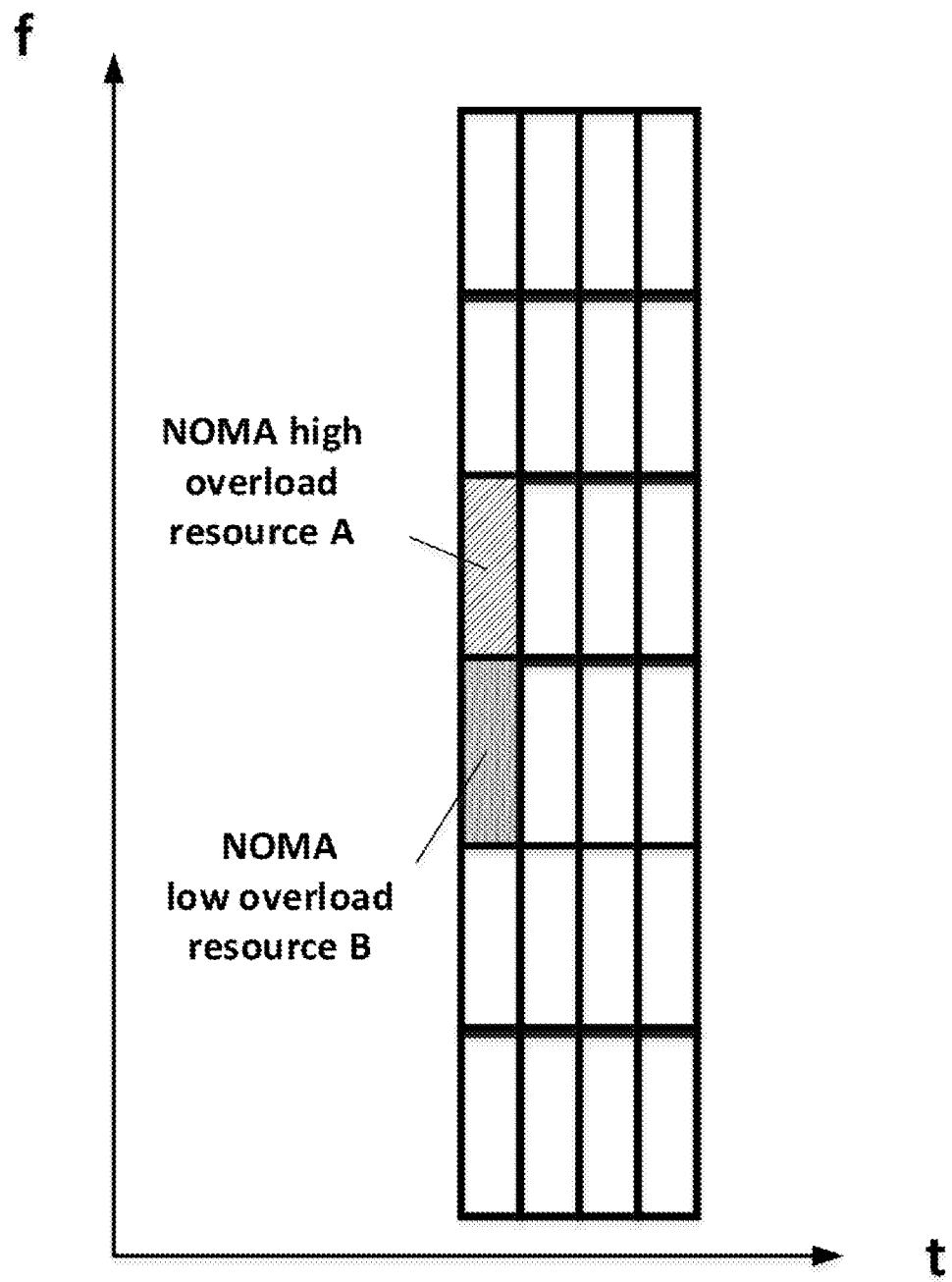
FIG. 8 is a diagram illustrating examples of overloading factor driven NOMA operations.
Figure 9:
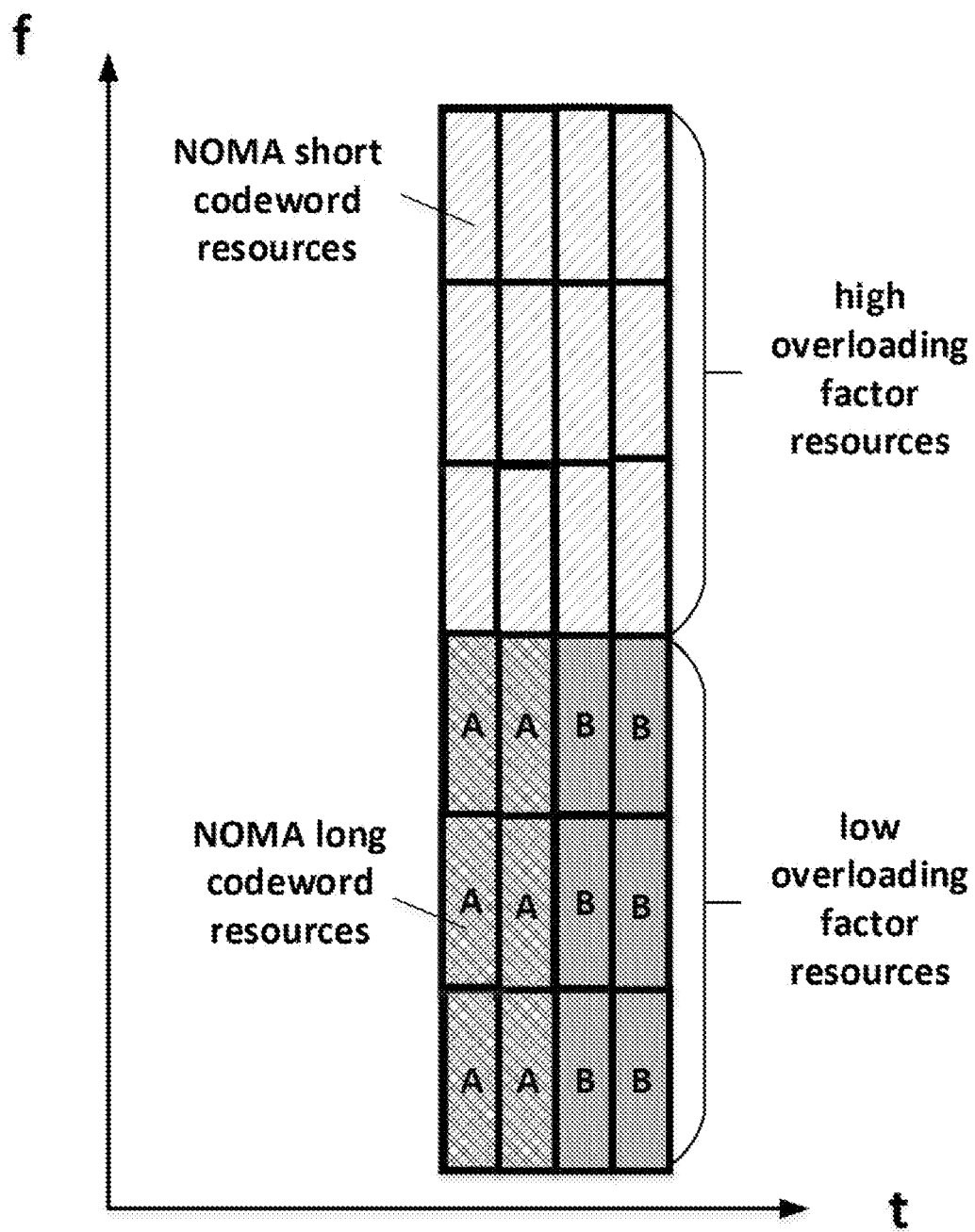
FIG. 9 is a diagram illustrating examples of NOMA resource selection based on an overloading factor and a codeword size or length.

FIG. 8 illustrates an example of overloading factor driven NOMA operations. As shown, a WTRU may be configured with and/or may select resource A if the WTRU has a high overloading factor for NOMA operations. The WTRU may be configured with and/or may select resource B if the WTRU has a low overloading factor for NOMA operations. FIG. 9 illustrates an example of resource configuration and selection using overloading factors (e.g. as illustrated in FIG. 8) and/or MA signatures as described herein (e.g. "A NOMA resource type may be defined by (e.g. configured based on) or associated with one or more of the following . . . A NOMA resource type may be associated with the length of a multiple access signature (e.g. the size of the codeword or sequence used such as a long or short codeword or sequence).... A NOMA resource type may be associated with an overloading factor (e.g. the value of the overloading factor such as a high overloading factor or a low overloading factor).").

As shown in FIG. 9, a WTRU may be configured (e.g. by a network) with a plurality of sets of resources (e.g. PRBs) for uplink transmission. Each of the plurality of sets of resources may be associated with at least one of an overloading factor value or a codeword size (e.g. codeword length). For example, a first set of resources (e.g. represented by the shaded area in the top half of the resource grid shown in FIG. 9) may be configured to be used with short codewords and/or high overloading factors. A second set of resources (e.g. represented by the shaded area in the bottom half of the resource grid shown in FIG. 9) may be configured to be used with long codewords and/or low overloading factors. The WTRU may receive the configuration and may decide which one or more resources from the first and/or second set of resources should be used for an uplink NOMA transmission.

The WTRU may perform a measurement such as a SNR or RSRP measurement. Based on the results of the measurement (e.g. by comparing the results to a measurement threshold), the received resource configuration, and/or one or more other factors (e.g. a random factor), the WTRU may select one or more resources from the configured plurality of sets of resources for the uplink NOMA transmission. For example, the WTRU may decide that the uplink NOMA transmission is to be performed with a long codeword and a low overloading factor, and may further decide, based on the resource configuration and/or the measurement results, that the second set of resources is more suitable for the uplink NOMA transmission. The WTRU may use all the resources in the second set to perform the uplink NOMA transmission or the WTRU may select a subset of the resources in the second set to perform the uplink NOMA transmission. For example, the WTRU may select the subset of resources corresponding to the area marked with "A" in FIG. 9 or the WTRU may select the subset of resources corresponding to the area marked with "B" in FIG. 9. In deciding the subset of resources, the WTRU may use a random factor (e.g. the random counter described herein).

As described herein, the WTRU may be configured with a MA signature (e.g. a codeword or sequence), for example in addition to the resource configuration, to be used for the uplink NOMA transmission. The WTRU may be configured with a measurement threshold (e.g. SNR and/or RSRP thresholds) to be used for determining which resource(s) should be selected. The MA signature and/or measurement threshold may be sent in a same configuration message as the resource configuration or they may be sent in different configuration message(s).

Figure 10:
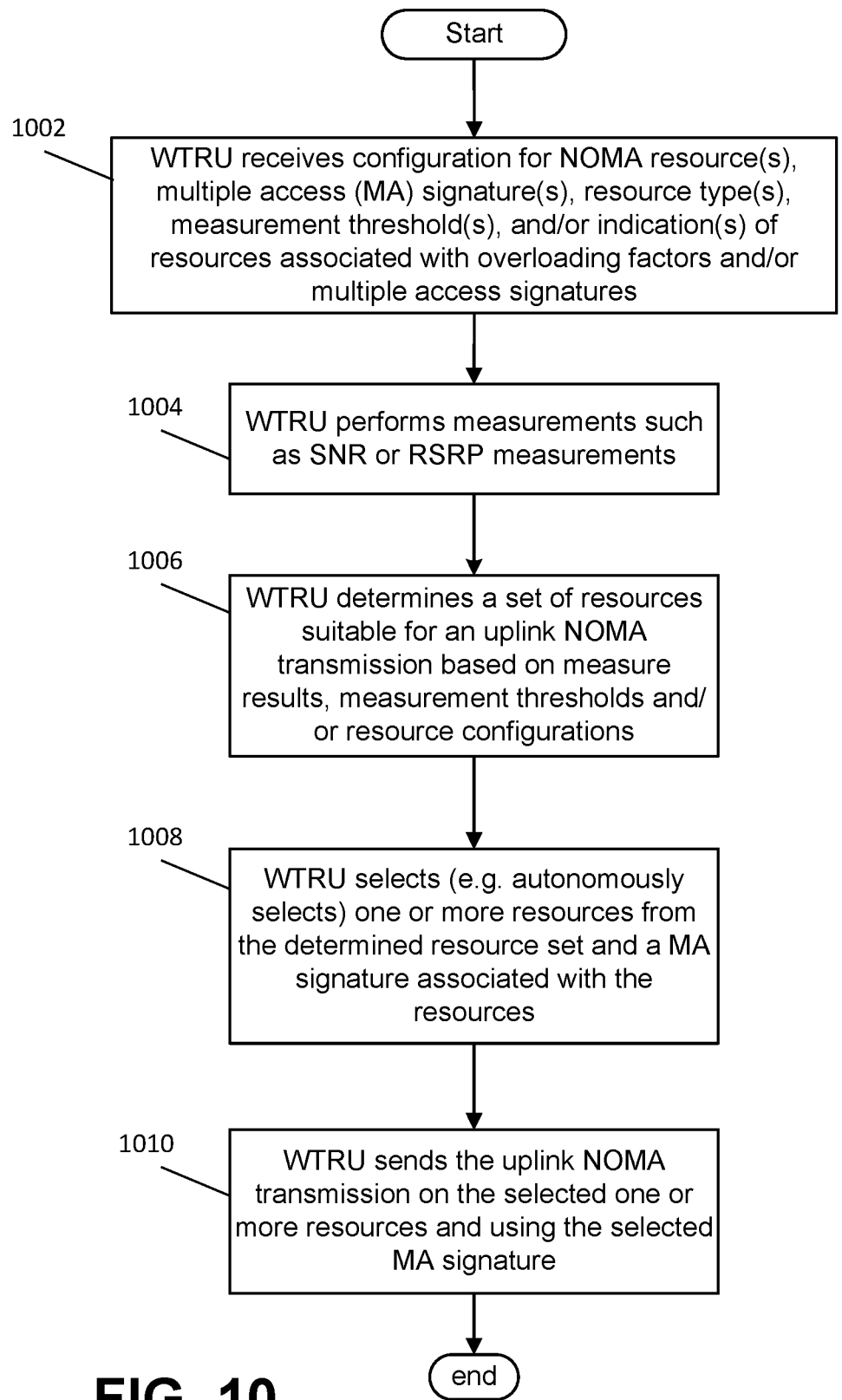
FIG. 10 is a diagram illustrating example operations that may be performed by a WTRU during NOMA resource selection.

FIG. 10 is a diagram illustrating example operations that may be performed by a WTRU during NOMA resource selection. At 1002, the WTRU may receive configuration information, e.g., from a network entity, regarding NOMA resource(s), multiple access (MA) signature(s), resource type, and/or measurement threshold(s) related to NOMA resource selection. For example, the configuration information may indicate a plurality of sets of the resources (or resource types) that the WTRU may use for NOMA transmission. Each set of resources (or each resource type) may be associated with one or more of measurement thresholds, overloading factors, MA signature lengths, etc. For example, the configuration information may indicate that each of the plurality of sets of resources is associated with (e.g. should be used with) a respective combination of a measurement threshold, an overloading factor value, an MA signature length, etc. At 1004, the WTRU may perform a measurement such as a SNR or RSRP measurement. At 1006, the WTRU may determine a set of resources among the configured sets of resources that may be suitable for an uplink NOMA transmission. The determination may be made based on results of the measurement, an overload factor value associated with the uplink NOMA transmission, and/or an MA signature (e.g. a codeword or sequence length) associated with the uplink NOMA transmission.

At 1008, the WTRU may select one or more resources from the determined resource set for sending the uplink NOMA transmission and may select an MA signature (e.g. a codeword or sequence) for the uplink NOMA transmission. The selection may be made by the WTRU, which may be autonomou (e.g. without further instructions from the network), for example, based on a random factor. At 1010, the WTRU may send the uplink NOMA transmission using the selected one or more resources and the selected MA signature.

A NOMA scheme may be selected by a WTRU based on a payload size, e.g. in combination with one or more of the factors described herein. The WTRU may (e.g., autonomously) select a NOMA scheme and/or resources for data transmission based on the payload size. A WTRU may (e.g., autonomously) select one or more of the following based on the payload size. The WTRU may select a NOMA signature (e.g., codewords, sequences, etc.) based on the payload size. The WTRU may select a resource based on the payload size. The WTRU may select a NOMA scheme based on the payload size. The WTRU may select a reference signal (e.g., a demodulation reference signal (DMRS)) based on the payload size.

A WTRU may utilize an association of NOMA schemes, resources, and/or payload sizes for NOMA operations (e.g., in manners similar to those described herein with respect to overloading factors, measurements, MA signatures, and/or the like). A WTRU may utilize an association of NOMA schemes, resources, signatures, reference signals and/or payload sizes for NOMA operations (e.g., in manners similar to those described herein with respect to overloading factors, measurements, MA signatures, and/or the like).

In examples (e.g., when a single NOMA scheme is used), a transmitting terminal (e.g., a WTRU) may select a short sequence and transmit that sequence on certain resources. The sequences transmitted from different transmitting terminals may overlap on the same resources. For example, the sequences may be transmitted on certain subcarriers when OFDM modulation is used. The sequences (e.g. short sequences) may or may not be scaled (e.g., multiplied by a data modulation symbol such as a QPSK symbol) before their transmission.

A transmitting terminal may transmit more than one sequence, for example, to increase the data rate for that terminal. The sequences transmitted from a first terminal may be orthogonal to each other in a given space while the sequences transmitted from multiple different terminals (e.g. including the first terminal) may be non-orthogonal to each other. Orthogonality between sequences from the first terminal may be achieved by using DFT eigenspace.

Assume that the respective lengths of a plurality of sequences are M and the sequences are mapped to M contiguous subcarriers. Each sequence may be designed such that it is invariant to a DFT operation, e.g., $S=\lambda s$ where $S$ may be the DFT of sequence $s$, and $\lambda$ may be the associated eigenvalue.

Generating DFT invariant sequences may include one or more of the following. A mother sequence x may be chosen. A DFT-invariant sequence may be derived based on $s = x + \lambda Fx + \lambda^2 FFx + \lambda^3 FFFx$, where F may be a DFT matrix and $Fs = S = \lambda s$. Multiple (e.g., four) DFT-invariant sequences may be generated from the same mother sequence by using four eigenvalues: 1, −1, j, and −j, where $j = \sqrt{-1}$. A mother sequence x may be a sequence or a type of sequences. For example, the mother sequence x may be a sequence used in a NOMA scheme (e.g., a multi-user shared access (MUSA) scheme).

The sequences utilized by terminal i may be denoted as $s_i^{\lambda_k}$, where i may be a user index and the eigenvalue associated with the sequence may be $\lambda_k \in \{1, -1, j, -j\}$, e.g., $S_i^{\lambda_k} = Fs_i^{\lambda_k} = \lambda_k s_i^{\lambda_k}$. Assume there are two WTRUs, each having two data modulation symbols to transmit. The sequences to be transmitted by the first WTRU may be denoted as $s_1^{\lambda_1}$ and $s_1^{\lambda_2}$, and the sequences to be transmitted by the second WTRU may be denoted as $s_2^{\lambda_1}$ and $s_2^{\lambda_2}$. $s_1^{\lambda_1}$ and $s_1^{\lambda_2}$ may have been generated from the same mother sequence while $s_2^{\lambda_1}$ and $s_1^{\lambda_2}$ may have been generated from another mother sequence. Assume $\lambda_1 = 1$ and $\lambda_2 = -1$ (e.g., the sequences to be transmitted from the same WTRU may have different associated eigenvalues). The received signal in the frequency domain (e.g., after a DFT operation is performed at the receiver for OFDM modulation and subcarriers have been selected), may be written as the following (e.g., discarding noises).

$$y = h_1 \odot (d_{11}s_1^{\lambda_1} + d_{12}s_1^{\lambda_2}) + h_2 \odot (d_{21}s_2^{\lambda_1} + d_{22}s_2^{\lambda_2})$$

where $h_1$ may be the frequency selective channel from the first transmitter and $h_2$ may be the frequency selective channel from the second transmitter. $\odot$ may denote a point-wise vector multiplication operation and $d_{ij}$ may denote the j'th data symbol of the i'th transmitter. As noted above, $d_{ij}$ may not be used, for example, when the sequence implicitly carries the data symbol.

In examples (e.g., when the sequences are short and mapped to contiguous subcarriers), the subcarriers to which the sequences are mapped may have a same or similar channel frequency response. The received signal may be written as follows.

$$y = h_1(d_{11}s_1^{\lambda_1} + d_{12}s_1^{\lambda_2}) + h_2(d_{21}s_2^{\lambda_1} + d_{22}s_2^{\lambda_2})$$

where $h_1$ and $h_2$ may be now scalars (e.g., channel coefficients). After taking the DFT of y, and using $S_i^{\lambda_k} = (\lambda k) s_i^{\lambda_k}$, the following may be derived:

$$Y = h_1 d_{11} S_1^{\lambda_1} + h_2 d_{21} S_2^{\lambda_1} + h_1 d_{12} S_1^{\lambda_2} + h_2 d_{22} S_2^{\lambda_2}$$
$$= h_1 d_{11} s_1^{\lambda_1} + h_2 d_{21} s_2^{\lambda_1} - h_1 d_{12} s_1^{\lambda_2} - h_2 d_{22} s_2^{\lambda_2}$$

The sequences associated with different eigenvalues may be separated as $$r_1 = \frac{y+Y}{2} = h_1 d_{11} s_1^{\lambda_1} + h_2 d_{21} s_2^{\lambda_1}$$
$$r_2 = \frac{y-Y}{2} = h_1 d_{12} s_1^{\lambda_2} + h_2 d_{22} s_2^{\lambda_2}$$

The receiver may have two sequences $r_1$, $r_2$, where one or more (e.g., each) of these sequences may be a superposition of codewords transmitted from different terminals and may not be orthogonal to each other. One or more (e.g., each) of these sequences may be processed (e.g., independently) to decode data from different terminals. Conventional non-orthogonal multiple access receiver techniques such as message passing algorithm, successive interference cancellation, etc., may be used, e.g., to decode the data.

A WTRU may transmit $\Sigma_k d_k s^{\lambda_k}$. If DFT invariant sequences are used as presented in the above example, the number of orthogonal sequences may be limited to 4 (e.g., since $\lambda_k \in \{1, -1, j, -j\}$. When more than two sequences are utilized, the receiver may perform more operations than presented above (e.g., so as to separate the sequences associated with different eigenvalues). The receiver may compute y, Fy, FFy, and/or FFFy. Using one or more of these values, the receiver may group sequences associated with different eigenvalues. The group(s) may further be processed by a NOMA receiver.

Figure 11:
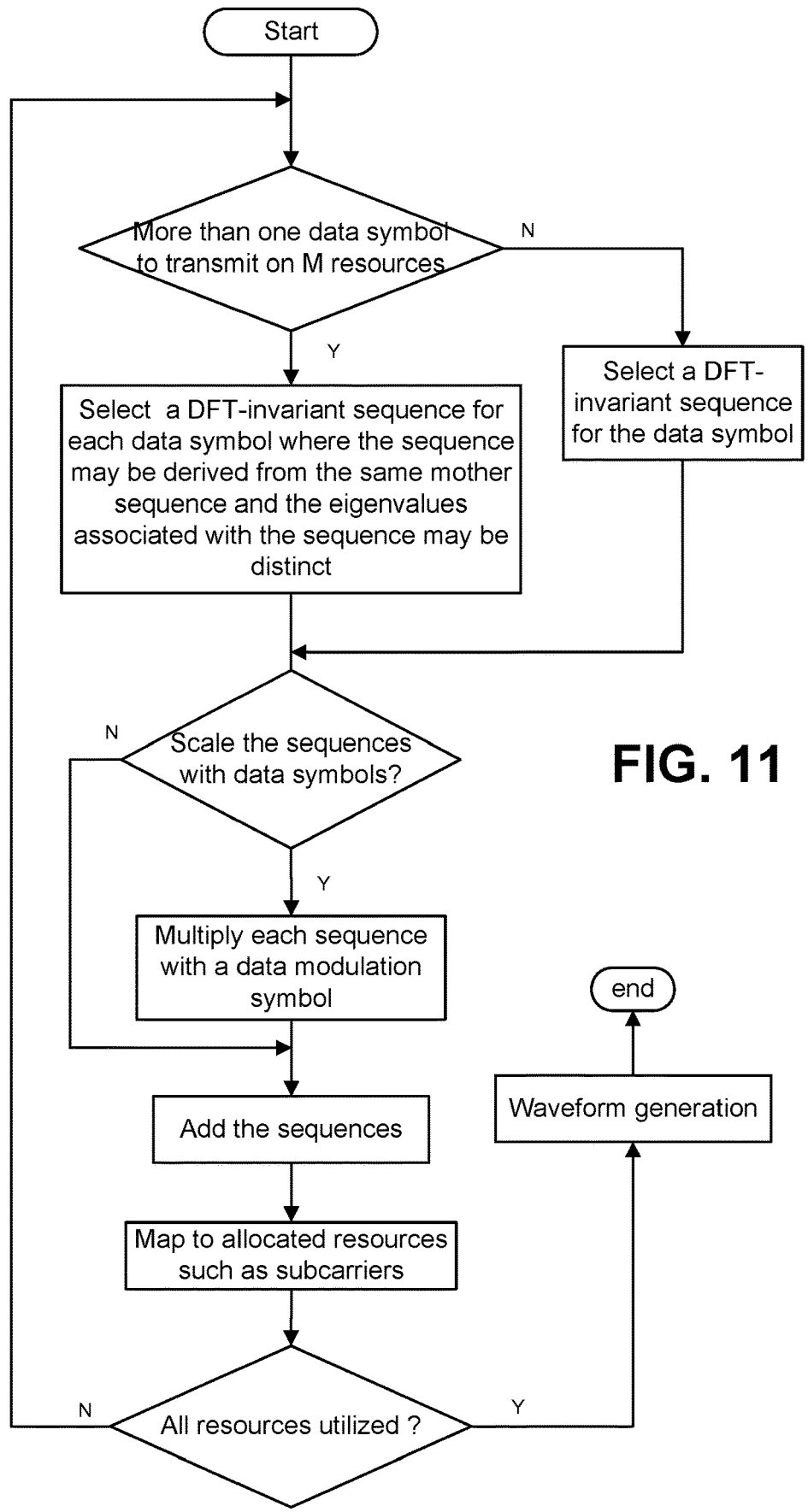
FIG. 11 is a diagram illustrating an example of a WTRU NOMA transmission.

FIG. 11 shows a high level example of a WTRU NOMA transmission. The codebook of sequences may be configured by a central controller (e.g. a base station). The number of sequences originated from the same WTRU and mapped to the same resources may be configured by the central controller, or dynamically signaled (e.g. via DCI) by the central controller. The number of sequences may be selected by the WTRU. The number of sequences may be indicated to a receiver, for example in a control channel. The eigenvalues associated with the sequences may be configured by the central controller, or dynamically signaled (e.g. via DCI) by the central controller. The eigenvalues may be selected by the WTRU. The eigenvalues may be indicated to a receiver, for example in a control channel. The indication or signaling of the eigenvalues may use two bits where each combination of the bits may indicate an eigenvalue. For example, 00 may indicate $\lambda = 1$, 01 may indicate $\lambda = -1$, 10 may indicate $\lambda = j$, and 11 may indicate $\lambda = -j$.

DFT-invariant sequences may be utilized to increase the overloading factor in a NOMA scheme, e.g., to increase the number of WTRUs that may transmit on the same resources. WTRUs may be categorize into several groups. One or more groups (e.g., all groups) may be configured to use DFT-invariant codewords generated from a specific set of one or more mother sequences. The same set of mother sequence(s) may be used by multiple groups (e.g., all groups) of WTRUs to generate the codewords. The DFT-invariant codewords may have different associated eigenvalues for different groups.

A single NOMA framework may be used to support different requirements. MA signatures (e.g. codewords) and/or parameters may be configurable such that NOMA operations may be adapted quickly and with flexibility based on the operating environment and/or requirements (e.g., to improve system throughput and/or efficiency). Multiple NOMA schemes may converge into a single NOMA scheme.

The set of codewords (e.g., the codebook) used by a WTRU to transmit data may be configurable. The configuration may be provided in a semi-static manner (e.g. via RRC signaling) by a central controller, such as a base station. The codebook may be a part of a NOMA resource set configured by the central controller. The codebook may be selected by the WTRU from a candidate set of codebooks (e.g. configured by the central controller) based on one or more parameters including payload sizes, receiver types, transmit power, time/frequency resources of a NOMA resource set, etc. A codebook may be assigned to be used for transmission within each NOMA resource set. The index of the codebook may be signaled, for example, semi-dynamically or dynamically, by a base station when a WTRU is given a transmission grant.

Different NOMA schemes, codeword types, and/or codeword sizes (e.g. codeword lengths) may coexist in different resources as described herein. Different NOMA schemes and/or codeword sizes may or may not coexist in a same resource. Different NOMA schemes may be associated with different codeword sizes (e.g. codeword lengths). For example, in RSMA, a relatively long spreading code with good correlation properties may be applied, e.g., to reduce multi-user interferences. A long spreading code may occupy a large number of resources. In examples (e.g., in SCMA), a relatively short sparse codebook may be applied. A SCMA codeword may occupy a small number of resources.

Resources may be shared between NOMA schemes with long codes and NOMA schemes with short codes. A set of resources may be occupied by a first NOMA scheme with long codes. At least a part of the set of resources may be shared with a second NOMA scheme with short codes. Certain codewords of the second NOMA scheme may overlap with the codewords of the first NOMA scheme.

Overlapped resources may be selected in such a way to reduce or eliminate their impact on the correlation properties of the codewords associated with a NOMA scheme (e.g., a NOMA scheme with long codes). Resource selection may depend on the set of available codewords for a NOMA scheme. Suppose a NOMA scheme has two codewords, $C_1=(C_{1,1}, \ldots, C_{1,K})$ and $C_2=(C_{2,1}, \ldots, C_{2,K})$, where each element of the codewords may occupy a resource element. The correlation of the full codewords may be low, e.g., $corr(C_1, C_2)$ may be low. Suppose one or more common parts of the two codewords may experience high interferences. If the remaining parts of the two codewords still have low correlations, the resources corresponding to the common part(s) of the two codewords may be shared by another NOMA scheme. Suppose $\mathbb{K}=\{1, \ldots, K\}$ and $\mathbb{K}_1$ is a subset of $\mathbb{K}$. Let $C_1'=\{C_{1,j}: j \in \mathbb{K}/\mathbb{K}_1\}$ and $C_2'=\{C_{2,j}: j \in \mathbb{K} \setminus \mathbb{K}_1\}$. If the correlation of the partial codewords is low, e.g., $corr(C_1', C_2')$ is low, the resources carrying a part of the codewords $\{C_{1,j}: j \in \mathbb{K}_1\}$ may be overlapped by codewords of another type of NOMA scheme.

While two codewords are used in the example above, similar techniques may be applied to more than two of the codewords of a NOMA scheme (e.g. to all of the codewords of the NOMA scheme). Some codewords of a NOMA scheme may not maintain low correlations with other codewords (e.g., when at least a part of the codewords is ignored). The codewords from a codebook may be restricted from being used. The selection of shared resources may result in restricted use of some codewords in a NOMA scheme.

Figure 12:
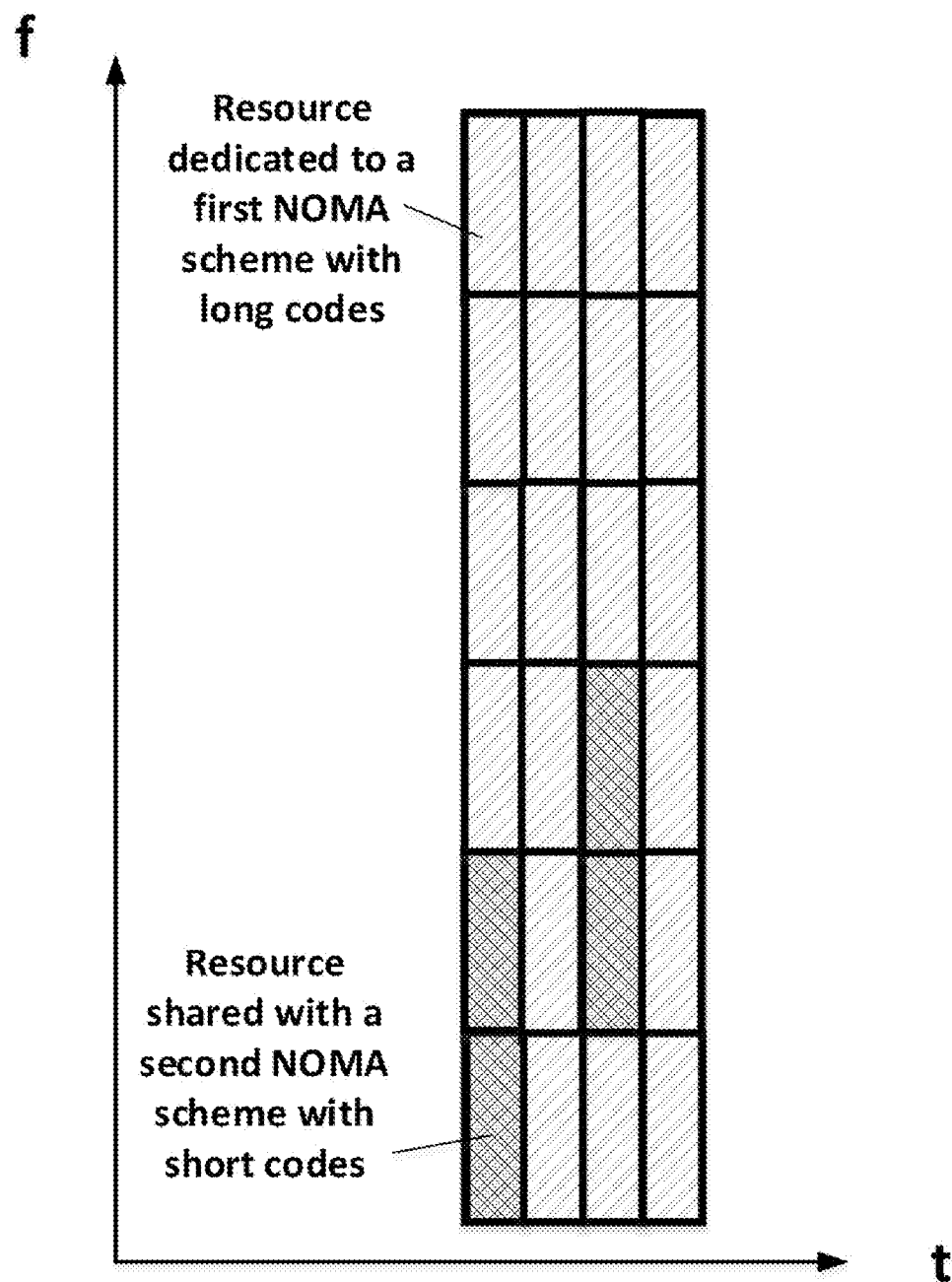
FIG. 12 is a diagram illustrating an example of resource sharing between two NOMA schemes.

FIG. 12 shows an example of resource sharing between two NOMA schemes. As shown, a first NOMA scheme with long codes may use all of the resources shown in FIG. 12. A first part of the resources may be dedicated for the first NOMA scheme (e.g., a NOMA scheme with long codes) while a second part of the resources may be shared between the first NOMA scheme and a second NOMA scheme (e.g., a NOMA scheme with short codes).

A receiver (e.g., a gNB) may use a SIC-based algorithm to decode the long codewords of a first NOMA scheme (e.g., which may be a RSMA scheme). The receiver (e.g., a gNB) may be able to decode data for the first NOMA scheme if low correlations are maintained between the codewords in the first NOMA scheme and the high interferences on at least a part of the codewords. When one or more (e.g., all) of the codewords from the first NOMA scheme are decoded, their impact on the shared resources may be removed. Codewords from a second NOMA scheme (e.g., which may be SCMA scheme) may then be decoded. The decoding may follow a message passing algorithm for SCMA so that multiple (e.g., all) codewords of the second NOMA scheme may be jointly decoded. Although the description herein focuses on two NOMA schemes, similar techniques may be applied to more than two NOMA schemes, e.g., resources may be shared among more than two NOMA schemes.

Figure 13:
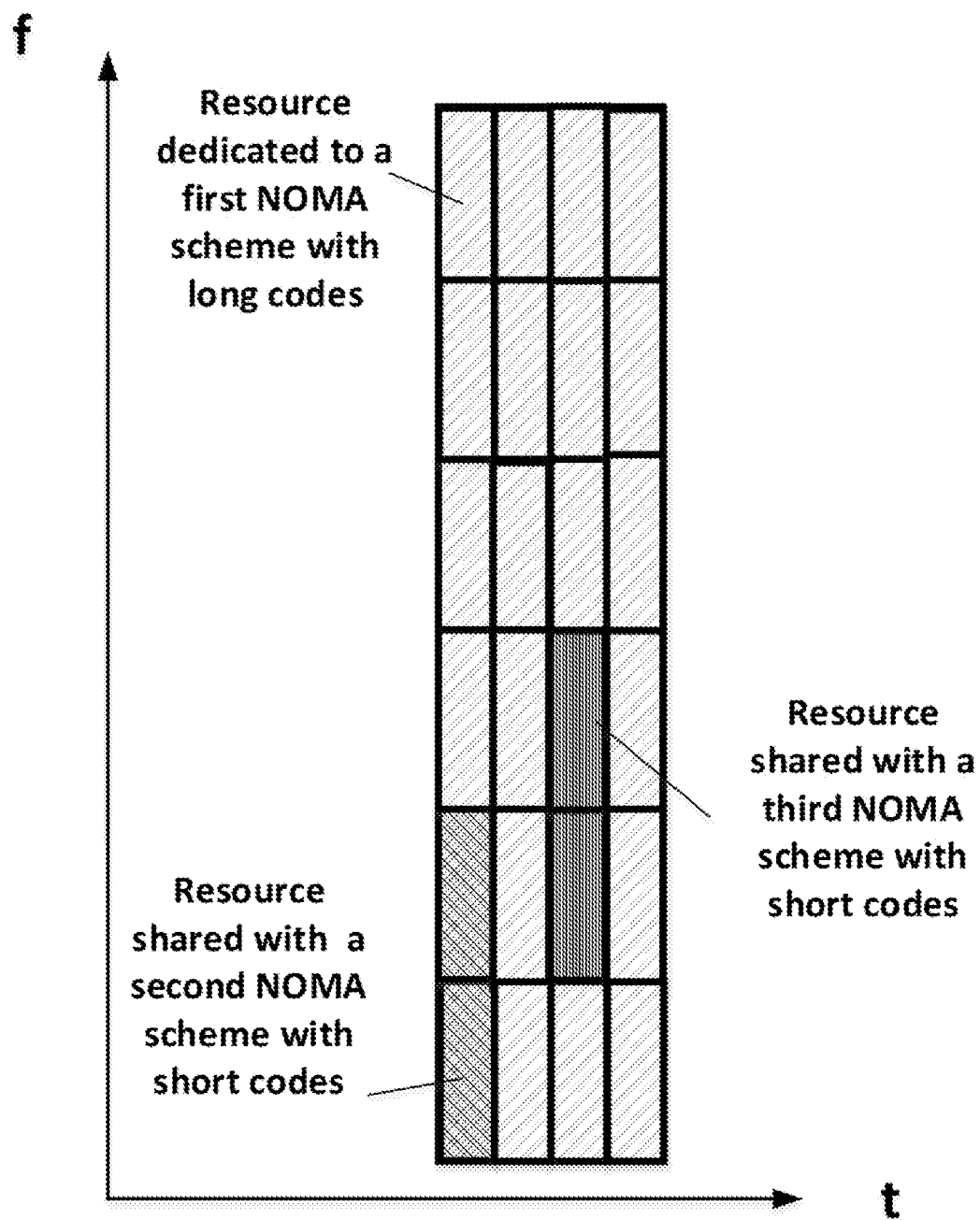
FIG. 13 is a diagram illustrating an example of a NOMA scheme with long codes sharing resources with two NOMA schemes with short codes.

FIG. 13 shows an example of a multi-NOMA scheme system in which a first NOMA scheme with long codes may share resources with two other NOMA schemes (e.g. second and third NOAM schemes) with short codes. As shown, a first NOMA scheme with long codes may use all of the resources shown in FIG. 13. A first part of those resources may be dedicated for the first NOMA scheme (e.g., a NOMA scheme with long codes). A second part of the resources may be shared between the first NOMA scheme and a second NOMA scheme (e.g., a NOMA scheme with short codes). A third part of the resources may be shared between the first NOMA scheme and a third NOMA scheme (e.g., another NOMA scheme with short codes).

Figure 14:
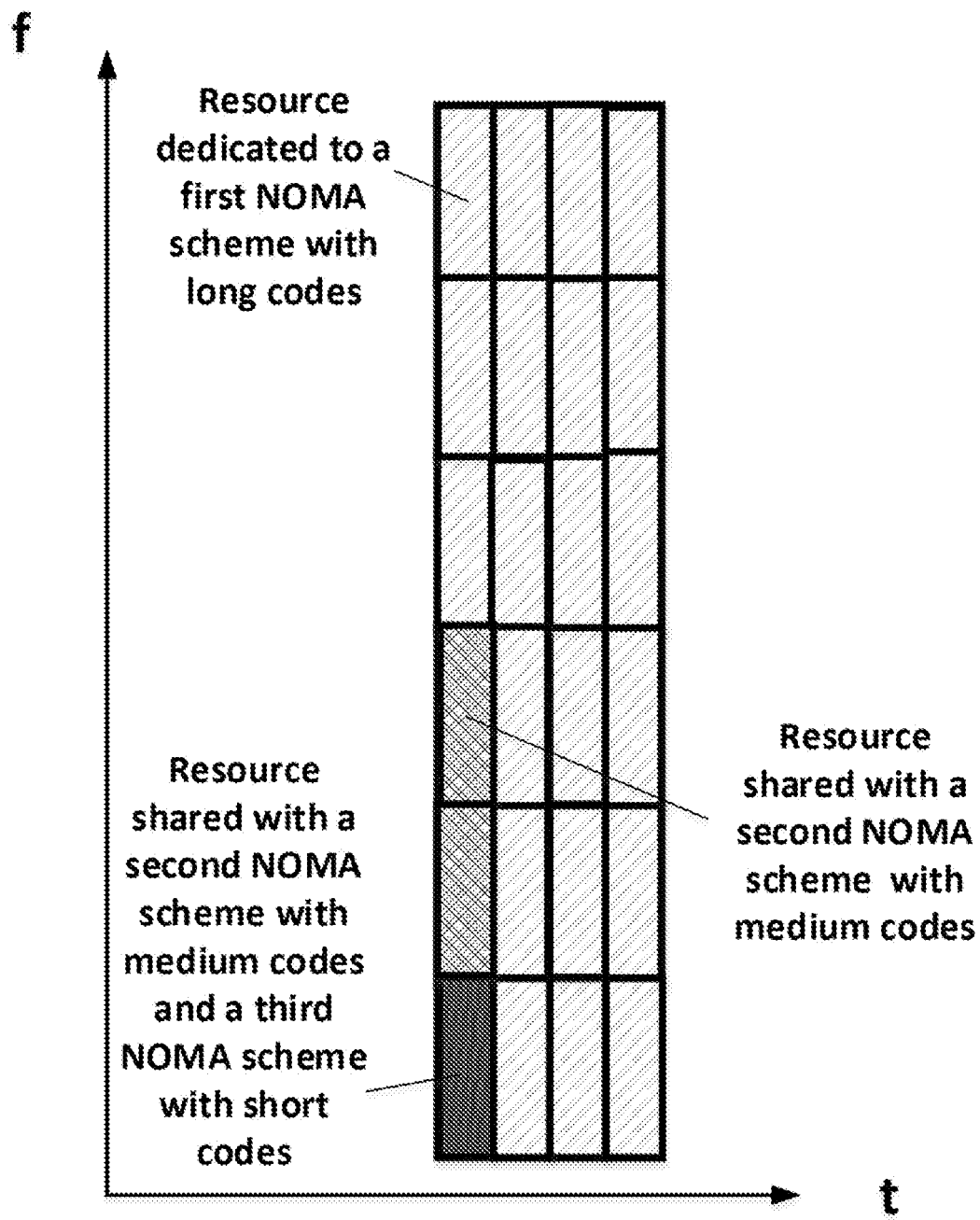
FIG. 14 is a diagram illustrating an example of a NOMA scheme with long codes sharing resources with a NOMA scheme with medium codes and/or with a NOMA scheme with short codes.

FIG. 14 shows an example of a multi-NOMA scheme system in which a first NOMA scheme with long codes may share resources with a second NOMA scheme with medium codes and with a third NOMA scheme with short codes. As shown, a first NOMA scheme with long codes may use all of the resources shown in FIG. 14. A first part of those resources may be dedicated for the first NOMA scheme (e.g., a NOMA scheme with long codes). A second part of the resources may be shared between the first NOMA scheme and a second NOMA scheme with medium codes. A third part of the resources may be shared between the first NOMA scheme, the second NOMA scheme, and a third NOMA scheme (e.g., a NOMA scheme with short codes).

Although the features and elements of the present invention are described in the preferred embodiments in particular combinations, each feature or element can be used alone without the other features and elements of the preferred embodiments or in various combinations with or without other features and elements of the present invention. Although the solutions described herein consider New Radio (NR), 5G or LTE, LTE-A specific protocols, it is understood that the solutions described herein are not restricted to this scenario and are applicable to other wireless systems as well.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), comprising:
a processor configured to:
receive configuration information from a base station, wherein the configuration information indicates a first set of resources and a second set of resources, wherein the first set of resources is associated with at least one of a first overloading factor value or a first multiple access signature size, and wherein the second set of resources is associated with at least one of a second overloading factor value or a second multiple access signature size;
perform a measurement;
select, based at least on a result of the measurement, one or more resources for performing an uplink non-orthogonal multiple access transmission, wherein the one or more resources are selected from the first set of resources or the second set of resources, wherein, if the one or more resources are selected from the first set of resources, the selection is further based on the at least one of the first overloading factor value or the first multiple access signature size, and wherein, if the one or more resources are selected from the second set of resources, the selection is further based on the at least one of the second overloading factor value or the second multiple access signature size; and
perform the uplink non-orthogonal multiple access transmission using the selected one or more resources.

2. The WTRU of claim 1, wherein the first multiple access signature size comprises a first codeword size and wherein the second multiple access signature size comprises a second codeword size.

3. The WTRU of claim 1, wherein the configuration information indicates that the first set of resources is associated with a first combination of one or more overloading factor values and one or more multiple access signature sizes, and that the second set of resources is associated with a second combination of one or more overloading factor values and one or more multiple access signature sizes.

4. The WTRU of claim 3, wherein the configuration information indicates that the first set of resources is to be used with an overloading factor having a value above a first overloading threshold and with a multiple access signature having a length below a first signature length threshold, the configuration information further indicating that the second set of resources is to be used with an overloading factor having a value below a second overloading threshold and with a multiple access signature having a length above a second signature length threshold.

5. The WTRU of claim 3, wherein the processor being configured to select the one or more resources for performing the uplink non-orthogonal multiple access transmission comprises the processor being configured to:
compare the result of the measurement with a measurement threshold;
determine an overloading factor and a multiple access signature associated with the uplink non-orthogonal multiple access transmission; and
select the one or more resources based on the comparison and the determined overloading factor and multiple access signature.

6. The WTRU of claim 5, wherein the uplink non-orthogonal multiple access transmission is transmitted using the selected one or more resources and the determined multiple access signature.

7. The WTRU of claim 6, wherein the multiple access signature is determined based on an indication received from the base station.

8. The WTRU of claim 5, wherein the processor is further configured to receive the measurement threshold from the base station.

9. The WTRU of claim 1, wherein the measurement includes a signal-to-noise ratio (SNR) measurement or a reference signal received power (RSRP) measurement.

10. The WTRU of claim 1, wherein the one or more resources are selected from the first set of resources or the second set of resources further based on a random factor.

11. A method implemented in a wireless transmit/receive unit (WTRU), the method comprising:
receiving configuration information from a base station, wherein the configuration information indicates a first set of resources and a second set of resources, wherein the first set of resources is associated with at least one of a first overloading factor value or a first multiple access signature size, and wherein the second set of resources is associated with at least one of a second overloading factor value or a second multiple access signature size;
performing a measurement;
selecting, based on at least a result of the measurement, one or more resources for performing an uplink non-orthogonal multiple access transmission, wherein the one or more resources are selected from the first set of resources or the second set of resources, wherein, if the one or more resources are selected from the first set of resources, the selection is further based on the at least one of the first overloading factor value or the first multiple access signature size, and wherein, if the one or more resources are selected from the second set of resources, the selection is further based on the at least one of the second overloading factor value or the second multiple access signature size; and
performing the uplink non-orthogonal multiple access transmission using the selected one or more resources.

12. The method of claim 11, wherein the first multiple access signature size comprises a first codeword size and the second multiple access signature size comprises a codeword size.

13. The method of claim 11, wherein the configuration information indicates that the first set of resources is associated with a first combination of one or more overloading factor values and one or more multiple access signature sizes, and that the second set of resources is associated with a second combination of one or more overloading factor values and one or more multiple access signature sizes.

14. The method of claim 13, wherein the configuration information indicates that the first set of resources is to be used with an overloading factor having a value above a first overloading threshold and with a multiple access signature having a length below a first signature length threshold, the configuration information further indicating that the second set of resources is to be used with an overloading factor having a value below a second overloading threshold and with a multiple access signature having a length above a second signature length threshold.

15. The method of claim 13, wherein selecting the one or more resources for performing the uplink non-orthogonal multiple access transmission comprises:
comparing the result of the measurement with a measurement threshold;
determining an overloading factor and a multiple access signature associated with the uplink non-orthogonal multiple access transmission; and
selecting the one or more resources based on the comparison and the determined overloading factor and multiple access signature.

16. The method of claim 15, wherein the uplink non-orthogonal multiple access transmission is transmitted using the selected one or more resources and the determined multiple access signature.

17. The method of claim 16, wherein the multiple access signature is determined based on an indication received from the base station.

18. The method of claim 15, further comprising receiving the measurement threshold from the base station.

19. The method of claim 11, wherein the measurement includes a signal-to-noise ratio (SNR) measurement or a reference signal received power (RSRP) measurement.

20. The method of claim 11, wherein the one or more resources are selected from the first set of resources or the second set of resources further based on a random factor.

* * * * *